United States Patent
Kikuchi et al.

(10) Patent No.: US 11,312,834 B2
(45) Date of Patent: Apr. 26, 2022

(54) STYRENE RESIN EXTRUDED FOAM BODY AND METHOD FOR PRODUCING SAME

(71) Applicant: KANEKA CORPORATION, Osaka (JP)

(72) Inventors: Takenori Kikuchi, Osaka (JP); Daishi Takahashi, Osaka (JP); Shunji Kurihara, Osaka (JP)

(73) Assignee: KANEKA CORPORATION, Osaka (JP)

( * ) Notice: Subject to any disclaimer, the term of this patent is extended or adjusted under 35 U.S.C. 154(b) by 254 days.

(21) Appl. No.: 16/564,431

(22) Filed: Sep. 9, 2019

(65) Prior Publication Data

US 2020/0002496 A1 Jan. 2, 2020

Related U.S. Application Data

(63) Continuation of application No. PCT/JP2018/007170, filed on Feb. 27, 2018.

(30) Foreign Application Priority Data

Mar. 7, 2017 (JP) .............................. JP2017-042991

(51) Int. Cl.
*C08J 9/14* (2006.01)
*C08J 9/00* (2006.01)
*C08K 3/04* (2006.01)
*C08K 5/00* (2006.01)

(52) U.S. Cl.
CPC ............ *C08J 9/0066* (2013.01); *C08J 9/146* (2013.01); *C08J 2201/03* (2013.01); *C08J 2203/164* (2013.01); *C08J 2205/052* (2013.01); *C08J 2325/08* (2013.01); *C08K 3/042* (2017.05); *C08K 5/0066* (2013.01); *C08K 2201/003* (2013.01)

(58) Field of Classification Search
CPC ...... C08J 9/0066; C08J 9/146; C08J 2201/03; C08J 2203/164; C08J 2205/052; C08J 2325/08; C08J 2325/06; C08J 9/0019; C08J 2203/162; C08J 3/22; C08J 3/226; C08K 3/042; C08K 5/0066; C08K 2201/003; C08K 3/04; C08K 2201/005; C08L 25/06; B29C 48/0012; B29B 7/002
See application file for complete search history.

(56) References Cited

U.S. PATENT DOCUMENTS

| | | |
|---|---|---|
| 6,340,713 B1 | 1/2002 | Gluck et al. |
| 2003/0042644 A1 | 3/2003 | Gokuraku et al. |
| 2006/0148916 A1 | 7/2006 | Loh et al. |
| 2010/0087555 A1 | 4/2010 | Vo et al. |
| 2010/0204350 A1* | 8/2010 | Kim ................ C08J 9/0066 521/57 |
| 2011/0284793 A1 | 11/2011 | Ponticiello et al. |
| 2013/0245142 A1 | 9/2013 | Okuda et al. |
| 2015/0337101 A1* | 11/2015 | Frohs ................. C08K 5/0066 521/146 |
| 2016/0083552 A1 | 3/2016 | Nosker et al. |
| 2016/0208067 A1 | 7/2016 | Kikuchi et al. |
| 2017/0183471 A1* | 6/2017 | Kikuchi .............. B29C 48/92 |

FOREIGN PATENT DOCUMENTS

| | | |
|---|---|---|
| EP | 3070118 A1 | 9/2016 |
| JP | 2001525001 A | 12/2001 |
| JP | 2004059595 A | 2/2004 |
| JP | 2004196907 A | 7/2004 |
| JP | 2008546892 A | 12/2008 |
| JP | 2010522808 A | 7/2010 |
| JP | 2010254780 A | 11/2010 |
| JP | 2012512917 A | 6/2012 |
| JP | 2013136646 A | 7/2013 |
| JP | 2013194101 A | 9/2013 |
| JP | 2013221110 A | 10/2013 |
| JP | 2015113416 A | 6/2015 |
| JP | 2016519191 A | 6/2016 |
| WO | 2007002703 A2 | 1/2007 |
| WO | 2015093195 A1 | 6/2015 |
| WO | 2015137363 A1 | 9/2015 |
| WO | 2015170602 A1 | 11/2015 |

OTHER PUBLICATIONS

Extended European Search Report issued in European Application No. 18764396.0, dated Oct. 2, 2020 (8 pages).
International Search Report issued in corresponding International Application No. PCT/JP2018/007170; dated Jun. 5, 2018 (2 pages).
International Preliminary Report on Patentability issued in corresponding International Application No. PCT/JP2018/007170; dated Sep. 19, 2019 (9 pages).

* cited by examiner

*Primary Examiner* — Irina S Zemel
(74) *Attorney, Agent, or Firm* — Osha Bergman Watanabe & Burton LLP

(57) ABSTRACT

A styrene resin extruded foam includes graphite and a styrene resin. The graphite is in an amount of 0.5 to 10.0 parts by weight relative to 100 parts by weight of the styrene resin. The graphite has an average particle diameter of 2.5 μm to 9 μm. A laser scattering intensity is not less than 5 {%/(mg/mL)}/wt % per unit solution concentration of the graphite as measured by a particular method.

16 Claims, 1 Drawing Sheet

STYRENE RESIN EXTRUDED FOAM BODY AND METHOD FOR PRODUCING SAME

TECHNICAL FIELD

One or more embodiments of the present invention relate to a graphite-containing styrene resin extruded foam which is obtained by extrusion foaming with use of a styrene resin and a foaming agent. One or more embodiments of the present invention further relate to a method for producing such a styrene resin extruded foam.

BACKGROUND

In general, a styrene resin extruded foam is continuously produced by (i) heating a styrene resin composition with use of an extruder or the like so that the styrene resin composition is melted, (ii) adding a foaming agent to a molten styrene resin composition under a high pressure condition, (iii) cooling a resultant mixture to a given resin temperature, and then (iv) extruding the mixture to a low pressure region.

A styrene resin extruded foam is used as, for example, a heat insulating material for a structure, because the styrene resin extruded foam is good in workability and heat insulating property. In recent years, there has been an increasing demand for energy conservation in houses, buildings, and the like. Thus, technical development of a foam that is higher in heat insulating property than a conventional foam has been desired.

As a method for producing a highly heat insulating foam, the following methods have been suggested: a method in which a cell diameter of an extruded foam is controlled to fall within a given range; a method in which a heat ray radiation inhibitor is used; and a method in which a foaming agent having a low thermal conductivity is used.

For example, Patent Literature 1 suggests a production method in which (i) fine cells, having an average cell diameter of 0.05 mm to 0.18 mm in a thickness direction of an extruded foam, are formed and (ii) a cell deformation ratio is further controlled.

Patent Literatures 2 and 3 suggest a production method in which, as a heat ray radiation inhibitor, graphite and/or titanium oxide is used in an amount falling within a given range.

Furthermore, a method for producing a styrene resin extruded foam is suggested in which an environmentally friendly fluorinated olefin (also referred to as a hydrofluoroolefin or HFO) whose ozone depleting potential is 0 (zero) and whose global warming potential is also low is used (see, for example, Patent Literatures 4 through 7).

CITATION LIST

Patent Literature

[Patent Literature 1]
Japanese Patent Application Publication, Tokukai, No. 2004-59595
[Patent Literature 2]
Japanese Patent Application Publication, Tokukai, No. 2004-196907
[Patent Literature 3]
Japanese Patent Application Publication, Tokukai, No. 2013-221110
[Patent Literature 4]
Published Japanese Translation of PCT International Application, Tokuhyo, No. 2008-546892
[Patent Literature 5]
Japanese Patent Application Publication, Tokukai, No. 2013-194101
[Patent Literature 6]
Published Japanese Translation of PCT International Application, Tokuhyo, No. 2010-522808
[Patent Literature 7]
PCT International Publication No. WO 2015/093195

As described above, there have been proposed methods for producing a highly heat insulating foam with use of various techniques and/or a combination thereof. However, there is room for improvement for individual techniques. The techniques are not sufficient to serve the purpose of producing a styrene resin extruded foam having an excellent heat insulating property that meets marketing needs.

SUMMARY

In one or more embodiments of the present invention, a styrene resin extruded foam, which has an excellent heat insulating property, may be easily obtained.

The inventors conducted a diligent study and completed one or more embodiments of the present invention.

Specifically, one or more embodiments of the present invention are arranged as below.

A styrene resin extruded foam, including: graphite in an amount of not less than 0.5 parts by weight and not more than 10.0 parts by weight relative to 100 parts by weight of a styrene resin, the graphite having an average particle diameter of 2.5 µm to 9 µm, a laser scattering intensity being not less than 5 {%/(mg/mL)}/wt % per unit solution concentration of the graphite as measured by subjecting a solution, in which the styrene resin extruded foam is dispersed in a solvent, to measurement by laser diffractometry with use of a laser beam with a wavelength of 632.8 nm.

One or more embodiments of the present invention allow easy production of a styrene resin extruded foam having an excellent heat insulating property.

DETAILED DESCRIPTION OF THE EMBODIMENTS

Figure 1A:
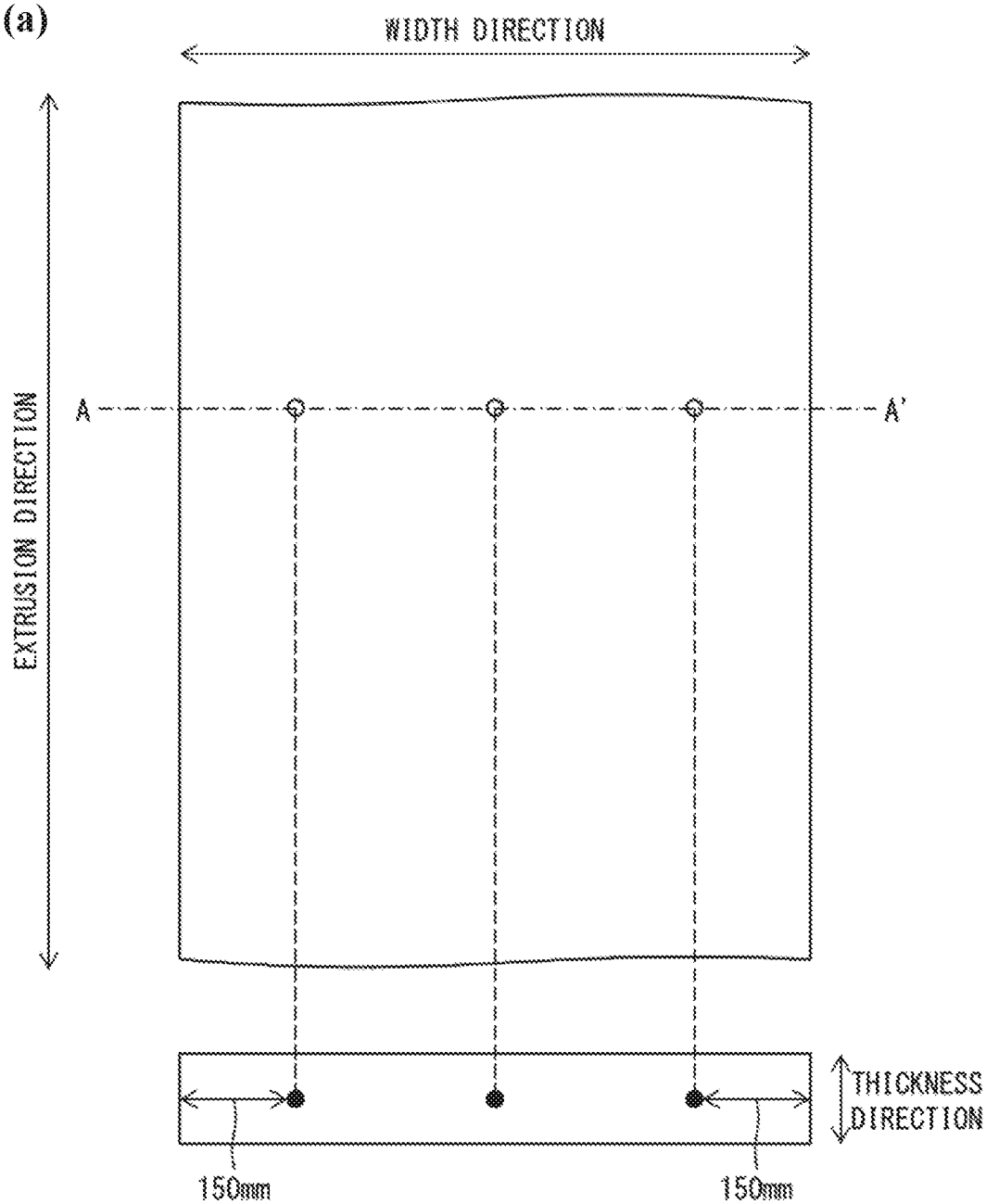
FIGS. 1 (a) and 1(b) show diagrams schematically illustrating an example method for measuring the average cell diameter of a styrene resin extruded foam in accordance with one or more embodiments of the present invention.

The following description will discuss one or more embodiments of the present invention. However, the present invention is not limited to these embodiments. The present invention is not limited to arrangements described below, but may be altered in various ways by a skilled person within the scope of the claims. Any embodiment and/or an example derived from a proper combination of technical means disclosed in different embodiments and/or examples are/is also encompassed in the technical scope of the present invention. All academic and patent literatures listed herein are incorporated herein by reference. Unless otherwise specified herein, a numerical range expressed as "A to B" means "not less than A (equal to or more than A) and not more than B (equal to or less than B)".

[1. Styrene Resin Extruded Foam]

A styrene resin extruded foam in accordance with one or more embodiments of the present invention contains graphite in an amount of not less than 0.5 parts by weight and not more than 10.0 parts by weight with respect to 100 parts by weight of a styrene resin, the graphite having an average particle diameter of 2.5 µm to 9 µm. The styrene resin extruded foam may be continuously produced by heating, with use of an extruder or the like, a styrene resin composition containing, as necessary, another additive(s) in an appropriate amount so that the styrene resin composition is melted, next adding a foaming agent to the molten resin under a high pressure condition, cooling the resulting molten resin to a given resin temperature, and then extruding the cooled resin to a low-pressure region. The styrene resin extruded foam is arranged such that the laser scattering intensity is not less than 5 {%/(mg/mL)}/wt % per unit solution concentration of the graphite as measured by subjecting a solution, in which the styrene resin extruded foam is dispersed in a solvent, to measurement by laser diffractometry with use of a laser beam with a wavelength of 632.8 nm.

The styrene resin used in one or more embodiments of the present invention is not limited to any particular one. Examples of the styrene resin encompass: (i) homopolymers each formed from a styrene monomer, such as styrene, methylstyrene, ethylstyrene, isopropyl styrene, dimethylstyrene, bromostyrene, chlorostyrene, vinyltoluene, or vinyl xylene, and copolymers each formed from a combination of two or more of such styrene monomers; and (ii) copolymers each formed through copolymerization of (a) such a styrene monomer and (b) one or more of other monomers such as divinylbenzene, butadiene, acrylic acid, methacrylic acid, methyl acrylate, methyl methacrylate, acrylonitrile, maleic anhydride, and itaconic anhydride. Note that it is possible to use a monomer(s), such as acrylic acid, methacrylic acid, methyl acrylate, methyl methacrylate, maleic anhydride, and/or itaconic anhydride, which is/are copolymerized with a styrene monomer, in an amount(s) that does/do not decrease physical properties, such as compressive strength, of the styrene resin extruded foam to be produced. Note also that the styrene resin used in one or more embodiments of the present invention is not limited to the above homopolymers and copolymers. Alternatively, the styrene resin can be a styrene resin obtained by blending any of (i) a homopolymer formed from a styrene monomer, (ii) a copolymer formed from two or more kinds of styrene monomers, (iii) a homopolymer formed from a monomer other than a styrene monomer, and (iv) a copolymer formed from a styrene monomer and one or more kinds of monomer(s) other than a styrene monomer. For example, the styrene resin used in one or more embodiments of the present invention can be a styrene resin obtained by blending (i) a homopolymer or a copolymer each formed from a styrene monomer(s) and (ii) diene rubber-reinforced polystyrene or acrylic rubber-reinforced polystyrene. Note also that the styrene resin used in one or more embodiments of the present invention can be a styrene resin having a branched structure, for the purpose of adjustment of a melt flow rate (hereinafter, referred to as an MFR), a melt viscosity during molding, a melt tension during the molding, and the like.

The styrene resin used in one or more embodiments of the present invention may have a MFR of 0.1 g/10 minutes to 50 g/10 minutes, because such a styrene resin brings about the following advantages: (i) the moldability during the extrusion foaming molding is excellent; (ii) it is easy to adjust, to a desired quantity, a discharge quantity during the molding, and it is easy to adjust, to respective desired values, a thickness, a width, an apparent density, and a closed cell ratio of the styrene resin extruded foam to be obtained; (iii) foamability is excellent (it is easy to adjust, to desired values or a desired property, the thickness, the width, the apparent density, the closed cell ratio, a surface property, and the like of the foam); (iv) the styrene resin extruded foam which is excellent in appearance and the like is obtained; and (v) the styrene resin extruded foam which is balanced in terms of characteristics (for example, mechanical strength or toughness, such as compressive strength, bending strength, or an amount of bending deflection) is obtained. In view of balance between (i) the moldability and the foamability and (ii) the mechanical strength and the toughness, the styrene resin may have a MFR of more preferably 0.3 g/10 minutes to 30 g/10 minutes, and particularly preferably 0.5 g/10 minutes to 25 g/10 minutes. Note that, in one or more embodiments of the present invention, the MFR is measured by the method A under the test condition H as specified in JIS K7210 (1999). In a case where a mixture of a plurality of kinds of resins is used as a base resin, the MFR of the mixture as a whole may be preferably within the above range.

In one or more embodiments of the present invention, of the foregoing styrene resins, a polystyrene resin is particularly suitable in view of cost effectiveness and processability. In a case where the extruded foam is required to have higher heat resistance, it may be preferable to use a styrene-acrylonitrile copolymer, (meth)acrylate copolymerized polystyrene, and/or maleic anhydride modified polystyrene. In a case where the extruded foam is required to have higher impact resistance, it may be preferable to use rubber-reinforced polystyrene. Each of these styrene resins can be used solely. Alternatively, two or more of these styrene resins, which are different in copolymer component, molecular weight, molecular weight distribution, branched structure, MFR, and/or like, can be used in combination.

For one or more embodiments of the present invention, a styrene resin extruded foam containing graphite as a heat ray radiation inhibitor has a good heat insulating property. The heat ray radiation inhibitor indicates a substance which reflects, scatters, or absorbs light in a near-infrared region or a far-infrared region.

Examples of the graphite used in one or more embodiments of the present invention encompass flake graphite, scale-like graphite, amorphous graphite, spheroidal graphite, and artificial graphite. Of these kinds of graphite, graphite which contains flake graphite or scale-like graphite as a main component may be preferably used because such graphite brings about a greater heat ray radiation inhibiting effect.

For one or more embodiments of the present invention, graphite has a fixed carbon content of preferably not less than 80%, more preferably not less than 85%. Graphite having a fixed carbon content of less than 80% contains an excessive impure content and may not produce a heat ray radiation inhibiting effect equivalent to the amount added. Using graphite having a fixed carbon content of not less than 80% allows production of a foam having a better heat insulating property.

For one or more embodiments of the present invention, graphite has an average particle diameter of not less than 2.5 µm and not more than 9 µm, preferably not less than 3 µm and not more than 6 µm, particularly preferably not less than 4 µm and not more than 6 µm. The average particle diameter of graphite as discussed in the present specification refers to a particle diameter at the time the cumulative volume relative to the volume of all particles reaches 50% which cumulative volume has been calculated by measuring and analyzing a particle size distribution by laser diffractometry based on Mie theory conforming to ISO13320:2009, JIS Z8825-1. The average particle diameter of graphite may be expressed as a volume average particle diameter according to laser diffractometry.

Graphite having a smaller average particle diameter leads to a higher production cost. Graphite having an average particle diameter of less than 2.5 μm in particular involves a high production cost including a crushing cost and is very expensive. A styrene resin extruded foam containing such graphite thus tends to be costly. If graphite has an average particle diameter of more than 9 μm, the average particle diameter will be larger than the thickness of a foam film of the styrene resin extruded foam. Thus, in a case where a styrene resin extruded foam containing such graphite is to be produced with use of graphite masterbatch, the foam film will be broken easily. This may decrease the percentage of closed cells and/or moldability.

In one or more embodiments of the present invention, the graphite is contained in an amount of not less than 0.5 parts by weight and not more than 10.0 parts by weight, preferably not less than 1.0 part by weight and not more than 5.0 parts by weight, and more preferably not less than 1.0 part by weight and not more than 3.0 parts by weight, relative to 100 parts by weight of the styrene resin. In a case where the amount of the graphite is less than 0.5 parts by weight, the graphite does not bring about a sufficient heat ray radiation inhibiting effect. In a case where the amount of the graphite is more than 5.0 parts by weight, the graphite does not bring about a heat ray radiation inhibiting effect equivalent to the amount and, therefore, there is no advantage in terms of a cost.

Conventional graphite-containing styrene resin extruded foams have a low laser scattering intensity per unit solution concentration of graphite as measured by laser diffractometry, and thus have a low thermal conductivity reducing effect relative to an amount of the graphite. In one or more embodiments of the present invention, a laser scattering intensity per unit solution concentration of graphite as measured by laser diffractometry is increased. This allows obtaining a styrene resin extruded foam having a low thermal conductivity, which is not obtainable from the conventional graphite-containing styrene resin extruded foams.

It may be preferable that a styrene resin extruded foam in accordance with one or more embodiments of the present invention have a laser scattering intensity, determined by the method below, per unit solution concentration of graphite of not less than 5 {%/(mg/mL)}/wt %. First, an intensity Lb of transmitted light in a case where a toluene solution containing no styrene resin extruded foam is irradiated with a He—Ne laser beam having a wavelength of 632.8 nm and an intensity Ls of transmitted light in a case where a toluene solution containing styrene resin extruded foam having a predetermined weight is irradiated with a He—Ne laser beam having a wavelength of 632.8 nm are determined. Then, a laser scattering intensity Ob % is found in accordance with the following formula: Ob=(1−Ls/Lb)100. On the basis of the laser scattering intensity Ob thus found, a laser scattering intensity per unit solution concentration of the styrene resin extruded foam is found. The laser scattering intensity per unit solution concentration thus found is divided by a content (wt %) of graphite in the styrene resin extruded foam having the predetermined weight. This allows the laser scattering intensity per unit solution concentration of graphite to be calculated. The laser scattering intensity per unit solution concentration of the graphite may be more preferably not less than 5.5 {%/(mg/mL)}/wt %, further more preferably not more than 9 {%/(mg/mL)}/wt %. In a case where the laser scattering intensity is less than 5%, it is impossible to achieve a sufficient thermal conductivity reducing effect relative to the amount of graphite introduced. In a case where the laser scattering intensity is more than 9 {%/(mg/mL)}/wt %, kneading tends to reduce the average particle diameter of graphite, and it accordingly becomes more difficult to achieve a thermal conductivity improving effect.

In a case where the laser scattering intensity per unit solution concentration of graphite is expressed as X {%/(mg/mL)}/wt % and the average particle size of the graphite is expressed as Y (m), it may be preferable that X+Y>10, and it may be more preferable that X+Y>11. As the average particle size Y decreases, the number of particles of graphite per unit solution concentration tends to increase and the laser scattering intensity X tends to increase. Meanwhile, in a case where the average particle size is small, a higher laser scattering intensity is required in order to exhibit a low thermal conductivity. Due to a relationship between the average particle size and the laser scattering intensity, the thermal conductivity improving effect tends to be magnified in a case where a sum of the average particle size and the laser scattering intensity exceeds a predetermined value.

Examples of a method and procedure for adding graphite to the styrene resin include: a method in which the various additives are added to the styrene resin and then the various additives and the styrene resin are mixed together by dry blending; a method in which the various additives are added to a molten styrene resin through a feeder provided in the middle of the extruder; a method in which (i) a masterbatch is prepared in advance by causing, with use of an extruder, a kneader, a Banbury mixer, a roll, or the like, the styrene resin to contain the various additives that are highly concentrated and (ii) the masterbatch and the styrene resin which is different from that contained in the masterbatch are mixed together by dry blending; and a method in which the various additives are supplied to the extruder through a feeding machine different from that used for the styrene resin.

For one or more embodiments of the present invention, graphite is added to a styrene resin by preferably adding the graphite in the form of a styrene resin masterbatch produced with use of a kneading device such as a Banbury mixer. In this case, it is easy to increase the laser scattering intensity per unit solution concentration of graphite as measured by laser diffractometry. This will be detailed later under "[3. Method for producing graphite-containing styrene resin masterbatch]".

For one or more embodiments of the present invention, a styrene resin for use in producing a graphite-containing styrene resin masterbatch (hereinafter referred to also as "graphite masterbatch") may be any styrene resin as long as the styrene resin causes no adverse effect as a component of a styrene resin extruded foam. The styrene resin may be the styrene resin described above.

A graphite masterbatch in accordance with one or more embodiments of the present invention may contain a stabilizer, additive(s), and/or the like described later that are contained in a styrene resin extruded foam, as long as such a stabilizer, additive(s), and/or the like does not prevent the effects of one or more embodiments of the present invention from being produced.

The foaming agent used in one or more embodiments of the present invention is not limited to any particular one, and can be a saturated hydrocarbon having 3 to 5 carbon atoms or can be alternatively a hydrofluoroolefin. Each of these foaming agents can be used solely. Alternatively, two or more of these foaming agents can be used in combination.

Examples of the saturated hydrocarbon having 3 to 5 carbon atoms used in one or more embodiments of the present invention encompass propane, n-butane, i-butane, n-pentane, i-pentane, and neopentane. Of these saturated hydrocarbons each having 3 to 5 carbon atoms, propane, n-butane, i-butane, or a mixture thereof may be preferable in view of the foamability. In view of the heat insulating property of the foam, n-butane, i-butane (hereinafter, also referred to as "isobutane"), or a mixture thereof may be preferable, and i-butane may be particularly preferable.

The hydrofluoroolefin used in one or more embodiments of the present invention is not limited in particular. However, a tetrafluoropropene may be preferable because the tetrafluoropropene has a low thermal conductivity in a gaseous state and is safe. Specific examples of the tetrafluoropropene encompass trans-1,3,3,3-tetrafluoropropene (trans-HFO-1234e), cis-1,3,3,3-tetrafluoropropene (cis-HFO-1234ze), and 2,3,3,3-tetrafluoropropene (trans-HFO-1234yf). Hydrofluoroolefin for use in one or more embodiments of the present invention may be chlorinated hydrofluoroolefin (that is, hydrochlorofluoroolefin). The hydrochlorofluoroolefin is not limited to any particular one, and may be preferably hydrochlorotrifluoropropene because the hydrochlorotrifluoropropene has a low thermal conductivity in a gaseous state and is safe. Specific examples of the hydrochlorotrifluoropropene include trans-1-chloro-3,3,3-trifluoropropene (trans-HCFO-1233zd). Each of these hydrofluoroolefins can be used solely. Alternatively, two or more of these hydrofluoroolefins can be used in combination.

The hydrofluoroolefin in accordance with one or more embodiments of the present invention may be added in an amount of preferably not less than 1.0 parts by weight and not more than 14.0 parts by weight, more preferably not less than 3.0 parts by weight and not more than 13.0 parts by weight, and particularly preferably not less than 4.0 parts by weight and not more than 12.0 parts by weight, relative to 100 parts by weight of the styrene resin. In a case where the amount of the hydrofluoroolefin added is less than 1.0 parts by weight relative to 100 parts by weight of the styrene resin, a heat insulating property enhancing effect of the hydrofluoroolefin cannot be expected much. In a case where the amount of the hydrofluoroolefin added is more than 14.0 parts by weight relative to 100 parts by weight of the styrene resin, the hydrofluoroolefin is separated from the molten resin during the extrusion foaming. This may cause a spot hole on the surface of the extruded foam or may cause a decrease in the closed cell ratio so that the heat insulating property is impaired. A spot hole refers to a hole made in a case where a partial mass of the hydrofluoroolefin crashes through the surface of the extruded foam and goes out to external air.

Hydrofluoroolefin in accordance with one or more embodiments of the present invention may be contained in an amount of preferably not less than 0.05 mol and not more than 1.0 mol, more preferably not less than 0.20 mol and not more than 0.90 mol, even more preferably not less than 0.25 mol and not more than 0.80 mol, relative to 1 kg of the styrene resin extruded foam. If the hydrofluoroolefin is contained in the extruded foam in an amount of less than 0.05 mol relative to 1 kg of the extruded foam, the extruded foam will contain too small an amount of hydrofluoroolefin. Thus, the hydrofluoroolefin will not produce a sufficient effect of improving the heat insulating property. If the hydrofluoroolefin is contained in the extruded foam in an amount of more than 1.0 mol relative to 1 kg of the extruded foam, the extruded foam will contain too large an amount of hydrofluoroolefin. Thus, the hydrofluoroolefin is separated from the molten resin during the extrusion foaming. This may cause a spot hole on the surface of the extruded foam or may cause a decrease in the closed cell ratio so that the heat insulating property is impaired.

For one or more embodiments of the present invention, the content of hydrofluoroolefin may be preferably the content seven days after production of the styrene resin extruded foam. Hydrofluoroolefin dissipates from the foam very slowly. The content changes little following seven days after the production. Thus, it is only necessary to learn the content seven days after the production.

Ozone layer depleting potential of the hydrofluoroolefin is zero or extremely low. Thus, global warming potential of the hydrofluoroolefin is very low. Therefore, the hydrofluoroolefin is an environmentally friendly foaming agent. Moreover, the hydrofluoroolefin has a low thermal conductivity in a gaseous state, and has flame retardancy. Therefore, by using the hydrofluoroolefin as the foaming agent of the styrene resin extruded foam, it is possible to cause the styrene resin extruded foam to have an excellent heat insulating property and an excellent flame retardancy.

In a case where the hydrofluoroolefin, such as the tetrafluoropropene, which has low solubility in the styrene resin is used, the hydrofluoroolefin is separated from the molten resin and/or vaporizes as the amount of the hydrofluoroolefin is increased. This causes (i) the hydrofluoroolefin, having been separated from the molten resin and/or having vaporized, to be a nucleating point, so that cells in the foam become fine, (ii) a decrease in the plasticizing effect on the molten resin due to a decrease in an amount of the foaming agent remaining in the resin, and (iii) the molten resin to be cooled and solidified due to latent heat of vaporization of the foaming agent. As a result, it tends to be difficult to impart a beautiful surface to the extruded foam and increase the thickness of the extruded foam. In particular, as has been described, in a case where the amount of the hydrofluoroolefin added is more than 14.0 parts by weight relative to 100 parts by weight of the styrene resin, the moldability is considerably deteriorated because, in addition to the above disadvantages (i) through (iii), the spot hole further occurs on the surface of the extruded foam.

The amount and the like of the saturated hydrocarbon having 3 to 5 carbon atoms and/or the hydrofluoroolefin to be added may be limited depending on various characteristics of the foam such as an intended foaming ratio and the flame retardancy. As a result, in a case where the amount added is outside a desired range, the moldability of the extruded foam or the like may not be sufficient.

In such cases, in one or more embodiments of the present invention, another foaming agent is further used. This makes it possible to bring about the plasticizing effect and/or an auxiliary foaming effect during the production of the foam. This ultimately allows a reduction in extrusion pressure and allows the foam to be stably produced.

Examples of the another foaming agent encompass (i) organic foaming agents such as: ethers such as dimethyl ether, diethyl ether, methyl ethyl ether, isopropyl ether, n-butyl ether, diisopropyl ether, furan, furfural, 2-methylfuran, tetrahydrofuran, and tetrahydropyran; ketones such as dimethyl ketone, methyl ethyl ketone, diethyl ketone, methyl-n-propyl ketone, methyl-n-butyl ketone, methyl-i-butyl ketone, methyl-n-amyl ketone, methyl-n-hexyl ketone, ethyl-n-propyl ketone, and ethyl-n-butyl ketone; saturated alcohols each having 1 to 4 carbon atom(s), such as methanol, ethanol, propyl alcohol, i-propyl alcohol, butyl alcohol, i-butyl alcohol, and t-butyl alcohol; carboxylic acid esters such as methyl formate, ethyl formate, propyl formate, butyl formate, amyl formate, methyl propionate, and ethyl propionate; and alkyl halides such as methyl chloride and ethyl chloride, (ii) inorganic foaming agents such as water and carbon dioxide, and (iii) chemical foaming agents such as an azo compound and tetrazole. Each of these foaming agents can be used solely as the another foaming agent. Alternatively, two or more of these foaming agents can be used in combination as the another foaming agent.

Of these foaming agents used as the another foaming agent, a saturated alcohol having 1 to 4 carbon atom(s), dimethyl ether, diethyl ether, methyl ethyl ether, methyl chloride, ethyl chloride, or the like may be preferable, in view of the foamability, the moldability of the foam, and the like. In view of flammability of the foaming agent, the flame retardancy or the heat insulating property (later described) of the foam, and the like, water or carbon dioxide may be preferable. Of these foaming agents, dimethyl ether and ethyl chloride may be particularly preferable in view of the plasticizing effect, and water may be particularly preferable in view of a cost and the heat insulating property enhancing effect brought about by control of a cell diameter.

In one or more embodiments of the present invention, the foaming agent may be added in an amount of preferably 2 parts by weight to 20 parts by weight, and more preferably 2 parts by weight to 15 parts by weight, in total, relative to 100 parts by weight of the styrene resin. In a case where the amount of the foaming agent added is less than 2 parts by weight, the foaming ratio is low and, accordingly, the resin foam may not have characteristics such as a lightweight property and the heat insulating property. In a case where the amount of the foaming agent added is more than 20 parts by weight, a defect such as a void may occur in the foam because the amount of the foaming agent is excessively large.

In one or more embodiments of the present invention, in a case where water and/or an alcohol is used as the another foaming agent, a water absorbing substance may be preferably added so that the extrusion foaming molding is stably carried out. Specific examples of the water absorbing substance used in one or more embodiments of the present invention encompass: water absorbing polymers such as a polyacrylate polymer, a starch-acrylic acid graft copolymer, a polyvinyl alcohol polymer, a vinyl alcohol-acrylate copolymer, an ethylene-vinyl alcohol copolymer, an acrylonitrile-methyl methacrylate-butadiene copolymer, a polyethylene oxide copolymer, and derivatives thereof; fine powders each having a hydroxyl group on a surface thereof and having a particle diameter of not more than 1000 nm, such as anhydrous silica (silicon oxide) having a silanol group on a surface thereof [AEROSIL, manufactured by Nippon AEROSIL CO., LTD, is, for example, commercially available]; water absorbing or water swelling layer silicates, such as smectite and water swelling fluorine mica, and products obtained by organification of such water absorbing or water swelling layer silicates; and porous substances such as zeolite, activated carbon, alumina, silica gel, porous glass, activated clay, diatomaceous earth, and bentonite. An amount of the water absorbing substance to be added is adjusted as appropriate depending on the amount and/or the like of the water to be added, but may be preferably 0.01 parts by weight to 5 parts by weight, and may be more preferably 0.1 parts by weight to 3 parts by weight, relative to 100 parts by weight of the styrene resin.

In a method for producing a styrene resin extruded foam in accordance with one or more embodiments of the present invention, a pressure at which the foaming agent is added or injected is not limited in particular. The pressure only needs to be higher than an internal pressure of the extruder or the like.

In one or more embodiments of the present invention, it is possible to impart the flame retardancy to the styrene resin extruded foam, by causing the styrene resin extruded foam to contain a flame retarder in an amount of not less than 0.5 parts by weight and not more than 8.0 parts by weight relative to 100 parts by weight of the styrene resin. In a case where the amount of the flame retarder contained is less than 0.5 parts by weight, it tends to be difficult for the styrene resin extruded foam to achieve good characteristics such as the flame retardancy. In a case where the amount of the flame retarder contained is more than 8.0 parts by weight, the stability during the production of the foam, the surface property, or the like may be impaired. Note, however, that the amount of the flame retarder contained may be more preferably adjusted as appropriate, depending on the amount of the foaming agent to be contained, the apparent density of the foam, a type or an amount of, for example, an additive contained having a flame retardance synergistic effect, and the like, so that, in a case where the flame retardancy is measured by the measurement method A specified in JIS A9521, the flame retardancy matches flame retardancy specified in JIS A9521.

As the flame retarder, a bromine flame retarder may be preferably used. In one or more embodiments of the present invention, specific examples of the bromine flame retarder encompass aliphatic bromine containing polymers such as hexabromocyclododecane, tetrabromobisphenol A-bis(2,3-dibromo-2-methylpropyl)ether, tetrabromobisphenol A-bis(2,3-dibromopropyl)ether, tris(2,3-dibromopropyl)isocyanurate, and a brominated styrene-butadiene block copolymer. Each of these bromine flame retarders can be used solely. Alternatively, two or more of these bromine flame retarders can be used in combination.

Of these bromine flame retarders, a mixed bromine flame retarder made up of tetrabromobisphenol A-bis(2,3-dibromo-2-methylpropyl)ether and tetrabromobisphenol A-bis(2,3-dibromopropyl)ether, the brominated styrene-butadiene block copolymer, or hexabromocyclododecane may be preferably used, because such bromine flame retarders, for example, (i) allow extrusion operation to be favorably carried out and (ii) do not adversely affect the heat resistance of the foam. Each of these substances can be used solely. Alternatively, some of these substances can be used as a mixture.

The styrene resin extruded foam in accordance with one or more embodiments of the present invention may contain the bromine flame retarder in an amount of preferably not less than 0.5 parts by weight and not more than 5.0 parts by weight, more preferably not less than 1.0 part by weight and not more than 5.0 parts by weight, and still more preferably not less than 1.5 parts by weight and not more than 5.0 parts by weight, relative to 100 parts by weight of the styrene resin. In a case where the amount of the bromine flame retarder contained is less than 0.5 parts by weight, it tends to be difficult for the styrene resin extruded foam to achieve good characteristics such as the flame retardancy. In a case where the amount of the bromine flame retarder contained is more than 5.0 parts by weight, the stability during the production of the foam, the surface property, or the like may be impaired.

In one or more embodiments of the present invention, it is possible to use, in combination with the flame retarder, a radical generating agent for the purpose of enhancement of the flame retardancy of the styrene resin extruded foam. Specific examples of the radical generating agent encompass 2,3-dimethyl-2,3-diphenylbutane, poly-1,4-diisopropylbenzene, 2,3-diethyl-2,3-diphenylbutane, 3,4-dimethyl-3,4-diphenylhexane, 3,4-diethyl-3,4-diphenylhexane, 2,4-diphenyl-4-methyl-1-pentene, and 2,4-diphenyl-4-ethyl-1-pentene. The radical generating agent may also be a peroxide such as dicumyl peroxide. Of these radical generating agents, a radical generating agent may be preferable which is stable at a temperature at which the resin is processed. Specifically, 2,3-dimethyl-2,3-diphenylbutane and poly-1,4-diisopropylbenzene are preferable. The radical generating agent is added in an amount of preferably 0.05 parts by weight to 0.5 parts by weight relative to 100 parts by weight of the styrene resin.

Furthermore, for the purpose of enhancement of the flame retardancy, in other words, as an auxiliary flame retarder, a phosphorus flame retarder such as phosphoric ester and phosphine oxide can be used in combination with the flame retarder, provided that the phosphorus flame retarder does not impair thermal stability of the styrene resin extruded foam. Examples of the phosphoric ester include triphenyl phosphate, tris(tributylbromoneopentyl)phosphate, tricresyl phosphate, trixylenyl phosphate, cresyl diphenyl phosphate, 2-ethylhexyl diphenyl phosphate, trimethyl phosphate, triethyl phosphate, tributyl phosphate, tris(2-ethylhexyl)phosphate, tris(butoxyethyl)phosphate, and condensed phosphoric esters. In particular, triphenyl phosphate or tris (tributylbromoneopentyl)phosphate may be preferable. Of phosphine oxide type phosphorus flame retarders, triphenylphosphine oxide may be preferable. Each of these phosphoric esters and phosphine oxides can be used solely. Alternatively, two or more of these phosphoric esters and phosphine oxides can be used in combination. The phosphorus flame retarder may be added in an amount of preferably 0.1 parts by weight to 2 parts by weight relative to 100 parts by weight of the styrene resin.

In one or more embodiments of the present invention, a stabilizer for stabilizing a resin and/or a stabilizer for stabilizing a flame retarder can be used as necessary. Such a stabilizer is not limited in particular. Specific examples of the stabilizer encompass: (i) epoxy compounds such as a bisphenol A diglycidyl ether type epoxy resin, a cresol novolac type epoxy resin, and a phenol novolac type epoxy resin; (ii) polyhydric alcohol esters each of which (a) is a mixture of esters each having at least one hydroxyl group in its molecule and each being obtained by reacting a polyhydric alcohol (such as pentaerythritol, dipentaerythritol, or tripentaerythritol) and a monovalent carboxylic acid (such as acetic acid or propionic acid) or a divalent carboxylic acid (such as adipic acid or glutamic acid) and (b) may contain a raw material polyhydric alcohol in a small amount; (iii) phenolic stabilizers such as triethylene glycol-bis-3-(3-tert-butyl-4-hydroxy-5-methylphenyl)propionate, pentaerythritol tetrakis[3-(3',5'-di-tert-butyl-4'-hydroxyphenyl)propionate], and octadecyl 3-(3,5-di-tert-butyl-4-hydroxyphenyl) propionate; (iv) phosphite stabilizers such as 3,9-bis(2,4-di-tert-butylphenoxy)-2,4,8,10-tetraoxa-3,9-diphospha-spiro [5.5] undecane, 3,9-bis(2,6-di-tert-butyl-4-methylphenoxy)-2,4,8,10-tetraoxa-3,9-diphospha-spiro [5.5] undecane, and tetrakis(2,4-di-tert-butyl-5-methylphenyl)-4,4'-biphenylene diphosphonite). These stabilizers may be preferable because these stabilizers do not decrease the flame retardancy of the foam and these stabilizers enhance the thermal stability of the foam.

As the heat ray radiation inhibitor which can be used in one or more embodiments of the present invention, white particles, such as titanium oxide, barium sulfate, zinc oxide, aluminum oxide, and antimony oxide, can be used in combination with the above-described graphite. Each of these white particles can be used solely. Alternatively, two or more of these white particles can be used in combination. Of these white particles, titanium oxide or barium sulfate may be preferable, and titanium oxide may be more preferable, because such white particles bring about a greater heat ray radiation inhibiting effect.

An average particle diameter of the white particles is not limited in particular. For example, an average particle diameter of titanium oxide may be preferably 0.1 µm to 10 µm, and more preferably 0.15 µm to 5 µm, in view of effective reflection of an infrared ray and in view of coloring of the resin.

In one or more embodiments of the present invention, the white particles may be contained in an amount of preferably not less than 1.0 part by weight and not more than 3.0 parts by weight, and more preferably not less than 1.5 parts by weight and not more than 2.5 parts by weight, relative to 100 parts by weight of the styrene resin. The white particles have a less heat ray radiation inhibiting effect than the graphite. Accordingly, in a case where the amount of the white particles contained is less than 1.0 part by weight, the white particles hardly bring about the heat ray radiation inhibiting effect even though the white particles are contained. In a case where the amount of the white particles contained is more than 3.0 parts by weight, the white particles do not bring about the heat ray radiation inhibiting effect equivalent to the amount, and, in the meanwhile, the flame retardancy of the foam tends to be deteriorated.

In one or more embodiments of the present invention, the heat ray radiation inhibitor may be contained in an amount of preferably not less than 0.5 part by weight and not more than 10.0 parts by weight, and more preferably not less than 1.0 parts by weight and not more than 6.0 parts by weight, in total, relative to 100 parts by weight of the styrene resin. In a case where the amount of the heat ray radiation inhibitor contained is less than 0.5 part by weight in total, it is difficult to achieve the heat insulating property. Meanwhile, as an amount of a solid additive contained such as the heat ray radiation inhibitor is increased, the number of nucleating points is increased, so that the cells in the foam become fine or the resin itself becomes poor in stretch. This tends to make it difficult to impart a beautiful surface to the extruded foam and increase the thickness of the extruded foam. In particular, in a case where the amount of the heat ray radiation inhibitor contained is more than 10.0 parts by weight in total, it tends to be difficult to impart a beautiful surface to the extruded foam and increase the thickness of the extruded foam. Furthermore, in such a case, extrusion stability and the flame retardancy tends to be impaired.

In one or more embodiments of the present invention, an additive can be further contained in the styrene resin as necessary, provided that the additive does not inhibit effects in accordance with one or more embodiments of the present invention. Examples of the additive encompass: inorganic compounds such as silica, calcium silicate, wollastonite, kaolin, clay, mica, and calcium carbonate; processing aids such as sodium stearate, calcium stearate, magnesium stearate, barium stearate, liquid paraffin, olefin wax, and a stearyl amide compound; light-resistant stabilizers such as a phenolic antioxidant, a phosphorus stabilizer, a nitrogen stabilizer, a sulfuric stabilizer, benzotriazoles, and hindered amines; cell diameter adjusting agents such as talc; moldability improving agents such as polyethylene glycol and a fatty acid ester of a polyvalent alcohol; flame retarders other than the foregoing flame retarders; antistatic agents; coloring agents such as a pigment; and plasticizers.

Examples of a method and procedure for adding such various additives to the styrene resin include: a method in which the various additives are added to the styrene resin and then the various additives and the styrene resin are mixed together by dry blending; a method in which the various additives are added to a molten styrene resin through a feeder provided in the middle of the extruder; a method in which (i) a masterbatch is prepared in advance by causing, with use of an extruder, a kneader, a Banbury mixer, a roll, or the like, the styrene resin to contain the various additives that are highly concentrated and (ii) the masterbatch and the styrene resin which is different from that contained in the masterbatch are mixed together by dry blending; and a method in which the various additives are supplied to the extruder through a feeding machine different from that used for the styrene resin. For example, a procedure is employed in which (i) the various additives are added to and mixed with the styrene resin, (ii) a resultant mixture is supplied to the extruder and heated so that the mixture is melted, and then (iii) the foaming agent is added to and mixed with the mixture. Note, however, that a timing at which the various additives or the foaming agent are/is added to the styrene resin and a time period during which the styrene resin is kneaded or the styrene resin and the various additives and/or the foaming agent are kneaded are not limited in particular.

A thermal conductivity of the styrene resin extruded foam in accordance with one or more embodiments of the present invention is not limited in particular. In view of the heat insulating property enough to cause the styrene resin extruded foam to function, for example, as a heat insulating material for a building or as a heat insulating material for a cool box or a refrigerator car, the thermal conductivity which is measured within seven days after the production in conformity to JIS A 9521 may be preferably not more than 0.0284 W/mK, more preferably not more than 0.0244 W/mK, and particularly preferably not more than 0.0224 W/m K.

The styrene resin extruded foam in accordance with one or more embodiments of the present invention may have an apparent density of preferably not less than 20 kg/m$^3$ and not more than 45 kg/m$^3$, and more preferably not less than 25 kg/m$^3$ and not more than 40 kg/m$^3$, in view of the heat insulating property enough to cause the styrene resin extruded foam to function, for example, as a heat insulating material for a building or as a heat insulating material for a cool box or a refrigerator car and in view of the lightweight property.

The styrene resin extruded foam in accordance with one or more embodiments of the present invention may have a closed cell ratio of preferably not less than 85%, and more preferably not less than 90%. In a case where the closed cell ratio is less than 85%, the foaming agent dissipates from the extruded foam early. This may cause a decrease in the heat insulating property.

The styrene resin extruded foam in accordance with one or more embodiments of the present invention may have an average cell diameter of preferably not less than 0.05 mm and not more than 0.5 mm, more preferably not less than 0.05 mm and not more than 0.4 mm, and particularly preferably not less than 0.05 mm and not more than 0.3 mm, in a thickness direction of the styrene resin extruded foam. In general, as the average cell diameter becomes smaller, a distance between cell walls in the foam becomes shorter. Accordingly, since a range of movement of the cells in the extruded foam is narrow while the shape is being imparted to the extruded foam in the extrusion foaming, it is difficult to deform the cells. This tends to make it difficult to impart a beautiful surface to the extruded foam and increase the thickness of the extruded foam. In particular, in a case where the average cell diameter of the styrene resin extruded foam is less than 0.05 mm in the thickness direction of the styrene resin extruded foam, it tends to be considerably difficult to (i) impart a beautiful surface to the extruded foam and (ii) increase the thickness of the extruded foam. In a case where the average cell diameter of the styrene resin extruded foam is more than 0.5 mm in the thickness direction of the styrene resin extruded foam, the styrene resin extruded foam may not achieve a sufficient heat insulating property.

Note that the average cell diameter of the styrene resin extruded foam in accordance with one or more embodiments of the present invention can be measured as follows with use of a microscope [manufactured by KEYENCE, DIGITAL MICROSCOPE VHX-900].

Figure 1B:
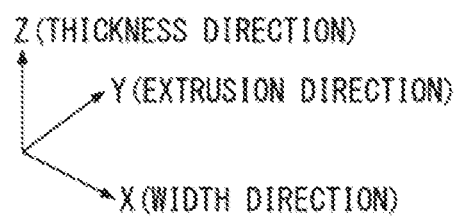

FIGS. 1(a) and 1(b) illustrate an example method for measuring the average cell diameter of a styrene resin extruded foam in accordance with one or more embodiments of the present invention. FIG. 1(a) shows an upper diagram illustrating a styrene resin extruded foam and a lower diagram illustrating a cross section of the styrene resin extruded foam taken along line A-A'. FIG. 1(b) shows the relation of the width direction (X axis), the extrusion direction (Y axis), and the thickness direction (Z axis) for FIG. 1(a). The three axes are orthogonal to one another.

Three portions of the obtained styrene resin extruded foam are observed. The three portions are (i) a portion in the middle of the styrene resin extruded foam in its width direction, (ii) a portion which is located 150 mm apart from one edge of the styrene resin extruded foam toward the other edge in the width direction, and (iii) a portion which is located 150 mm apart from the other edge of the styrene resin extruded foam toward the one edge in the width direction. Specifically, a cross section of the middle portion, in the thickness direction, of each of the three portions is observed (that is, the portions indicated with black dots in FIG. 1(a)). More specifically, the middle portion, in the thickness direction, of each of the three portions is observed under a microscope in the ZX plane and YZ plane in FIG. 1(b) and photographed at a magnification of 100 times. Then, three 2-millimeter straight lines are arbitrarily drawn in the thickness direction in each of such magnified photographs (three straight lines for each observed direction at each observed portion), and the number "a" of cells in contact with the three straight lines is counted. From the number "a" thus counted, an average cell diameter A in the thickness direction is calculated for each observed direction at each observed portion by the following Expression (1). An average of average cell diameters thus calculated for the three portions (two directions at each portion) is regarded as an average cell diameter A (average) in the thickness direction of the styrene resin extruded foam.

Average cell diameter $A$ (mm) in a thickness direction at each observed portion=2×3/the number "$a$" of cells  (1)

The middle portion, in the thickness direction, of each of the above three portions is observed under a microscope in the YZ plane in FIG. 1(b) and photographed at a magnification of 100 times. Then, three 2-millimeter straight lines are arbitrarily drawn in the extrusion direction in such a magnified photograph (three straight lines for each observed portion), and the number "b" of cells in contact with the three straight lines is counted. From the number "b" thus counted, an average cell diameter B in the extrusion direction is calculated for each observed portion by the following Expression (2). An average of average cell diameters thus calculated for the three portions is regarded as an average cell diameter B (average) in the extrusion direction of the styrene resin extruded foam.

Average cell diameter $B$ (mm) in an extrusion direction at each observed portion=2×3/the number "$b$" of cells (2)

The middle portion, in the thickness direction, of each of the above three portions is observed under a microscope in the ZX plane in FIG. 1($b$) and photographed at a magnification of 100 times. Then, three 2-millimeter straight lines are arbitrarily drawn in the width direction in such a magnified photograph (three straight lines for each observed portion), and the number "c" of cells in contact with the three straight lines is counted. From the number "c" thus counted, an average cell diameter C in the width direction is calculated for each observed portion by the following Expression (3). An average of average cell diameters thus calculated for the three portions is regarded as an average cell diameter C (average) in the width direction of the styrene resin extruded foam.

Average cell diameter $C$ (mm) in a width direction at each observed portion=2×3/the number "$c$" of cells (3)

The styrene resin extruded foam in accordance with one or more embodiments of the present invention may have a cell deformation ratio of preferably not less than 0.7 and not more than 2.0, more preferably not less than 0.8 and not more than 1.5, still more preferably not less than 0.8 and not more than 1.2. In a case where the cell deformation ratio is less than 0.7, the styrene resin extruded foam has low compressive strength. Accordingly, it may not be possible for the extruded foam to secure strength suitable for a purpose. Furthermore, since the cells each attempt to return to a spherical shape, the extruded foam tends to be poor in maintaining dimensions (shape). In a case where the cell deformation ratio is more than 2.0, the number of cells in the thickness direction of the extruded foam is decreased. This reduces the heat insulating property enhancing effect which is brought about by a shape of each of the cells.

Note that the cell deformation ratio of the styrene resin extruded foam in accordance with one or more embodiments of the present invention can be calculated from the following Expression (4) with use of the foregoing average cell diameters.

Cell deformation ratio (no unit)=average cell diameter $A$ (average)/{[average cell diameter $B$ (average)+average cell diameter $C$ (average)]/2} (4)

The styrene resin extruded foam in accordance with one or more embodiments of the present invention may have a thickness of preferably not less than 10 mm and not more than 150 mm, more preferably not less than 20 mm and not more than 130 mm, and particularly preferably not less than 30 mm and not more than 120 mm, in view of (i) the heat insulating property enough to cause the styrene resin extruded foam to function, for example, as a heat insulating material for a building or as a heat insulating material for a cool box or a refrigerator car, (ii) the bending strength, and (iii) the compressive strength.

Note that, as described in Examples and Comparative Examples of one or more embodiments of the present invention, after impartation of the shape by the extrusion foaming molding, both surfaces of the styrene resin extruded foam, which both surfaces are plane surfaces each perpendicular to the thickness direction, may be each cut off at a depth of approximately 5 mm in the thickness direction so that the styrene resin extruded foam has a product thickness. However, the thickness of the styrene resin extruded foam in accordance with one or more embodiments of the present invention indicates a thickness of the styrene resin extruded foam whose both surfaces are not cut off after the impartation of the shape by the extrusion foaming molding, unless otherwise specified.

According to one or more embodiments of the present invention, it is thus possible to easily obtain a styrene resin extruded foam which has an excellent heat insulating property and an excellent flame retardancy.

[2. Method for Producing Styrene Resin Extruded Foam]

A method for producing a styrene resin extruded foam in accordance with one or more embodiments of the present invention is a production method used to produce a styrene resin extruded foam described in the above [1. Styrene resin extruded foam]. Out of arrangements used in the method for producing a styrene resin extruded foam in accordance with one or more embodiments of the present invention, arrangements which have been already described in the above [1. Styrene resin extruded foam] will not be described here.

According to the method for producing a styrene resin extruded foam in accordance with one or more embodiments of the present invention, a styrene resin, graphite, and as necessary, a flame retarder, a stabilizer, a heat ray radiation inhibitor, any other additive and/or the like are supplied to a heat-melting section of an extruder or the like. In so doing, it is possible to add a foaming agent to the styrene resin under a high pressure condition at any stage. A mixture of the styrene resin, the graphite, the foaming agent, and any other additive is caused to be a fluid gel (in other words, a molten resin). The fluid gel is cooled to a temperature suitable for extrusion foaming, and then extruded to a low pressure region through a die so that the fluid gel is foamed. In this way, a foam is formed.

A heating temperature, at which the mixture is heated in the heat-melting section so that the mixture is melted, only needs to be equal to or higher than a temperature at which the styrene resin melts. However, the heating temperature may be preferably a temperature at which degradation of molecules of the resin, which degradation is caused by an effect of an additive or the like, is prevented as much as possible, and may be preferably, for example, 150° C. to 260° C. A time period during which the mixture is melted and kneaded in the heat-melting section cannot be uniquely specified, because the time period varies depending on an amount of the styrene resin extruded per unit time and/or a type of the extruder used as the heat-melting section and as a melting and kneading section. The time period is set as appropriate to a time period necessary for the styrene resin, the foaming agent, and the additive to be uniformly dispersed and mixed together.

Examples of the melting and kneading section include a screw extruder. However, the melting and kneading section is not limited in particular, provided that the melting and kneading section is one that is used for usual extrusion foaming.

As a foaming molding method in accordance with one or more embodiments of the present invention, the following method is, for example, employed. That is, an extruded foam is obtained by releasing the fluid gel from a high pressure region to the low pressure region through a slit die whose opening, which is used for extrusion molding, has a linear slit shape. The extruded foam thus obtained is then molded into a plate-shaped foam, having a large cross-sectional area, with use of, for example, (i) a mold attached to or provided so as to be in contact with the slit die and (ii) a forming roll provided on a downstream side of the mold so as to be adjacent to the mold. By (i) adjusting a shape of a surface of the mold on which surface the extruded foam flows and (ii) adjusting a temperature of the mold, the foam is caused to achieve a desired cross-sectional shape, a desired surface property, and a desired quality.

[3. Method for Producing Graphite-Containing Styrene Resin Masterbatch]

A method for producing a graphite-containing styrene resin masterbatch in accordance with one or more embodiments of the present invention is a method for producing a graphite masterbatch which method is used to produce a styrene resin extruded foam described under [1. Styrene resin extruded foam] above. Out of arrangements used in the method for producing a graphite masterbatch in accordance with one or more embodiments of the present invention, arrangements which have been already described in the above [1. Styrene resin extruded foam] will not be described here.

A method for producing a styrene resin extruded foam in accordance with one or more embodiments of the present invention is characterized by including an extrusion-foaming step of melting and kneading, in an extruder, (i) a styrene resin masterbatch containing graphite in an amount of not less than 25 parts by weight and not more than 400 parts by weight relative to 100 parts by weight of a styrene resin, (ii) another styrene resin, and (iii) a foaming agent and then extrusion-foaming the resulting product. The method for producing a styrene resin extruded foam may preferably further include a stirring step of kneading at least a styrene resin and graphite with use of a kneading device including a twin-screw stirrer so as to prepare a styrene resin masterbatch.

A method for producing a graphite masterbatch through a stirring step in accordance with one or more embodiments of the present invention may be preferably a melting-and-kneading method including (i) melting and kneading a styrene resin and other components under a load with use of a kneading device including a twin-screw stirrer such as a Banbury mixer and then (ii) cutting the resulting product into pellets, particles, or the like.

Specifically, in this melting-and-kneading method, first, a styrene resin and graphite are kneaded with use of a kneading device (e.g., an intensive mixer, an internal mixer, or a Banbury mixer, which are capable of kneading a resin while applying a load) including a twin-screw stirrer to prepare a masterbatch. In this case, the concentration of the masterbatch is not limited to any particular value, but the masterbatch may be preferably prepared with graphite contained in an amount of not less than 25 parts by weight and not more than 400 parts by weight relative to 100 parts by weight of the styrene resin in view of the balance between the kneading property and cost. Graphite may be contained in an amount of more preferably not less than 40 parts by weight and not more than 300 parts by weight, particularly preferably not less than 40 parts by weight and not more than 250 parts by weight.

The kneading in accordance with one or more embodiments of the present invention which kneading involves use of a kneading device including a twin-screw stirrer preferably includes a step in which kneading is carried out under a load of not less than 4 kgf/cm$^2$ for not shorter than 15 minutes and ends with a resin temperature of not lower than 170° C., more preferably under a load of not less than 5 kgf/cm$^2$ for not shorter than 20 minutes. The kneading device such as the Banbury mixer can increase a mixing performance by application of a load. A load of not less than 4 kgf/cm$^2$ allows graphite in the styrene resin to be kneaded sufficiently and thus increases the laser scattering intensity, thereby making it easy to achieve a low thermal conductivity. Further, in a case where the kneading is performed for not shorter than 15 minutes, the polystyrene in the Banbury mixer can have a viscosity that allows the polystyrene to be easily mixed with the graphite. This allows the graphite to be sufficiently dispersed in the resin particles, and accordingly makes it easier to achieve a low thermal conductivity. To allow the styrene resin to have a viscosity that allows the graphite to be easily dispersed in the styrene resin, the graphite may be preferably mixed with the polystyrene until the resin temperature is not lower than 170° C. Kneading under a load of not less than 5 kgf/cm$^2$ may be preferable because such kneading tends to increase the laser scattering intensity stably and thereby allows a low thermal conductivity to be achieved easily. Kneading for not shorter than 20 minutes may be preferable because such kneading tends to increase the laser scattering intensity stably and thereby allows a low thermal conductivity to be achieved easily.

Carrying out kneading under a load with use of a kneading device including a twin-screw stirrer as described above allows more light to be scattered, in other words, increases the laser scattering intensity. This increases the heat ray radiation inhibiting performance of the graphite, and thereby allows a styrene resin extruded foam to have a reduced thermal conductivity. The laser scattering intensity is increased presumably because kneading causes detachment of graphite and thus increases the number of graphite particles, thereby allowing more light to be scattered.

For one or more embodiments of the present invention, the stirring step involving use of a kneading device including a twin-screw stirrer may be preferably carried such that b>1.4a, where a {%/(mg/mL)}/wt % is a laser scattering intensity per unit solution concentration of the graphite as measured by subjecting a solution, in which the graphite before being kneaded with the styrene resin is dispersed in a solvent, to measurement by laser diffractometry with use of a laser beam with a wavelength of 632.8 nm, and where b {%/(mg/mL)}/wt % is a laser scattering intensity per unit solution concentration of the graphite as measured by subjecting a solution, in which masterbatch as kneaded is dispersed in a solvent, to measurement by laser diffractometry with use of a laser beam with a wavelength of 632.8 nm. By carrying out kneading with use of the above kneading device as described above, the laser scattering intensity per unit solution concentration of the graphite is increased. As described above, it is necessary that the laser scattering intensity a per unit solution concentration of the graphite {%/(mg/mL)}/wt % before being kneaded and laser scattering intensity b {%/(mg/mL)}/wt % after being kneaded satisfy a relation: b>a. If, on the contrary, b s a, it is not easy to achieve a high thermal conductivity reducing effect relative to an amount of the graphite introduced. In particular, b>1.4a may be preferable, since the thermal conductivity reducing effect tends to increase when b>1.4a.

The present invention is not limited to the embodiments, but can be altered by a skilled person in the art within the scope of the claims. The present invention also encompasses, in its technical scope, any embodiment derived by appropriately combining technical means disclosed in differing embodiments. Furthermore, a new technical feature can be formed by combining technical means disclosed in differing embodiments.

One or more embodiments of the present invention may be configured as follows:

[1] A styrene resin extruded foam, including: graphite in an amount of not less than 0.5 parts by weight and not more than 10.0 parts by weight relative to 100 parts by weight of a styrene resin, the graphite having an average particle diameter of 2.5 μm to 9 μm, a laser scattering intensity being not less than 5 {%/(mg/mL)}/wt % per unit solution concentration of the graphite as measured by subjecting a solution, in which the styrene resin extruded foam is dispersed in a solvent, to measurement by laser diffractometry with use of a laser beam with a wavelength of 632.8 nm.

[2] The styrene resin extruded foam according to [1], wherein the laser scattering intensity per unit solution concentration of the graphite is not less than 5.5 {%/(mg/mL)}/wt %.

[3] The styrene resin extruded foam according to [1] or [2], wherein X+Y>10, where X {%/(mg/ml)}/wt % is the laser scattering intensity per unit solution concentration of the graphite, and Y (μm) is the average particle diameter of the graphite.

[4] The styrene resin extruded foam according to any one of [1] to [3], wherein the average particle diameter of the graphite is 3 μm to 6 μm.

[5] The styrene resin extruded foam according to any one of [1] to [4], wherein the graphite has a fixed carbon content of not less than 80%.

[6] The styrene resin extruded foam according to any one of [1] to [5], wherein: an amount of a hydrofluoroolefin added as a foaming agent to 100 parts by weight of the styrene resin is not less than 1.0 part by weight and not more than 14.0 parts by weight.

[7] The styrene resin extruded foam according to any one of [1] to [6], wherein the hydrofluoroolefin is contained in an amount of not less than 0.05 mol and not more than 1.0 mol relative to 1 kg of the styrene resin extruded foam.

[8] The styrene resin extruded foam according to any one of [1] to [7], wherein the hydrofluoroolefin is a tetrafluoropropene.

[9] The styrene resin extruded foam according to any one of [1] to [8], further including: a bromine flame retarder in an amount of not less than 0.5 parts by weight and not more than 5.0 parts by weight relative to 100 parts by weight of the styrene resin.

[10] The styrene resin extruded foam according to any one of [1] to [9], wherein the styrene resin extruded foam has a thermal conductivity of not more than 0.0224 W/mK which thermal conductivity is measured within seven days of production of the styrene resin extruded foam in conformity to JIS A 9521.

[11] The styrene resin extruded foam according to any one of [1] to [10], wherein the styrene resin extruded foam has a thickness of not less than 10 mm and not more than 150 mm.

[12] The styrene resin extruded foam according to any one of [1] to [11], wherein the styrene resin extruded foam has an apparent density of not less than 20 kg/m$^3$ and not more than 45 kg/m$^3$ and a closed cell ratio of not less than 85%.

[13] A method for producing a styrene resin extruded foam according to any one of [1] to [12], the method including the step of: an extrusion-foaming step of melting and kneading, in an extruder, (i) a styrene resin masterbatch containing graphite in an amount of not less than 25 parts by weight and not more than 400 parts by weight relative to 100 parts by weight of a styrene resin, (ii) another styrene resin, and (iii) a foaming agent and then extrusion-foaming a melted-and-kneaded product.

[14] The method according to [13], further including: a stirring step of kneading at least the styrene resin and the graphite in a kneading device including a twin-screw stirrer so as to prepare the styrene resin masterbatch.

[15] The method according to [14], wherein the kneading is carried out under a load of not less than 4 kgf/cm$^2$ for not shorter than 15 minutes and ends with a resin temperature of not lower than 170° C.

[16] The method according to [14], wherein the kneading is carried out under a load of not less than 5 kgf/cm$^2$ for not shorter than 20 minutes.

[17] The method according to any one of [14] to [16], wherein the stirring step is carried out such that b>1.4a, where a {%/(mg/mL)}/wt % is a laser scattering intensity per unit solution concentration of the graphite as measured by subjecting a solution, in which the graphite before being kneaded with the at least the styrene resin is dispersed in a solvent, to measurement by laser diffractometry with use of a laser beam with a wavelength of 632.8 nm, and b {%/(mg/mL)}/wt % is a laser scattering intensity per unit solution concentration of the graphite as measured by subjecting a solution, in which the styrene resin masterbatch as kneaded is dispersed in a solvent, to measurement by laser diffractometry with use of a laser beam with the wavelength of 632.8 nm.

EXAMPLES

The following description will discuss Examples of one or more embodiments of the present invention. Note that one or more embodiments of the present invention are obviously not limited to Examples below.

Raw materials used in Examples and Comparative Examples are as follows.

Base Resin

Styrene resin [available from PS Japan Corporation, G9401; MFR 2.2 g/10 minutes]

Heat Ray Radiation Inhibitor

Graphite A [available from MARUTOYO Co., Ltd., M-885, scale-like graphite, fixed carbon content: 89%, laser scattering intensity per unit solution concentration of the graphite: 3.5 {%/(mg/mL)}/wt %, specific surface area: 1.44 m$^2$/cm$^3$]

Graphite B [available from MARUTOYO Co., Ltd., SGP-40B, scale-like graphite, fixed carbon content: 98%, laser scattering intensity per unit solution concentration of the graphite: 4.0 {%/(mg/mL)}/wt %, specific surface area: 1.70 m$^2$/cm$^3$]

Graphite C [available from MARUTOYO Co., Ltd., M-88, scale-like graphite, fixed carbon content: 89%, laser scattering intensity per unit solution concentration of the graphite: 3.0 {%/(mg/mL)}/wt %, specific surface area: 1.01 m$^2$/cm$^3$]

Graphite D [available from Ito Graphite Co., Ltd., X-20, scale-like graphite, fixed carbon content: 98%, laser scattering intensity per unit solution concentration of the graphite: 2.6 {%/(mg/mL)}/wt %, specific surface area: 0.470 m$^2$/cm$^3$]

Flame Retarder

Mixed bromine flame retarder [available from Dai-ichi Kogyo Seiyaku Co., Ltd., GR-125P] made up of tetrabromobisphenol A-bis(2,3-dibromo-2-methylpropyl)ether and tetrabromobisphenol A-bis(2,3-dibromopropyl)ether Auxiliary Flame Retarder Triphenylphosphine oxide [SUMITOMO SHOJI CHEMICALS CO., LTD.]

Stabilizer

Bisphenol-A-glycidyl ether [available from ADEKA Corporation, EP-13]

Dipentaerythritol-adipic acid reaction mixture [available from Ajinomoto Fine-Techno Co., Inc., PLENLIZER ST210]

Triethylene glycol-bis-3-(3-tert-butyl-4-hydroxy-5-methylphenyl)propionate [available from Songwon Japan K.K., SONGNOX 2450FF]

Other Additives

Calcium stearate [available from Sakai Chemical Industry Co., Ltd., SC-P]

Bentonite [available from HOJUN Co., Ltd., BEN-GEL BLITE 11K]

Silica [available from Evonik Degussa Japan Co., Ltd., Carplex BS-304F]

Amide ethylene-bis-stearate [available from Nichiyu Corporation, ALFLOW H-50S]

Polyethylene glycol [Dai-Ichi Kogyo Seiyaku Co., Ltd., PEG 6000]

Stearic acid monoglyceride [available from Riken Vitamin Co. Ltd., RIKEMAL S-100P]

Foaming Agent

Trans-HFO-1234ze [available from Honeywell Japan]

Dimethyl ether [available from Iwatani Corporation]

Water [tap water in Settsu City, Osaka]

The specific surface area of graphite was measured with use of a particle size analyzer of a laser diffraction scattering type (Microtrac MT3300 II, available from NIKKISO CO., LTD.). The specific surface area of graphite dispersed in water was measured by laser diffraction scattering. The measurement conditions were as follows: solvent: water; solvent refractive index=1.333; particle transmission=absorption.

Each of the Examples and Comparative Examples involved analyzing and evaluating, by the methods below, the amount of graphite contained, average particle diameter D50 and laser scattering intensity of the graphite, the thickness of the styrene resin extruded foam (before cutting), amount of HFO-1234ze contained per kilogram of the extruded foam, apparent density, closed cell ratio, average cell diameter, cell deformation ratio, thermal conductivity, and JIS flammability.

(1) Measurement of Graphite Content

A test piece was cut out from a styrene resin extruded foam, and was then heated at 170° C. for 10 minutes for removal of the foaming agent. Approximately 10 mg of the resulting product was used as a sample. The sample was subjected to the following treatments I through III in succession, with use of a thermogravimetry device (available from SII NanoTechnology Inc.; TG/DTA 220U) equipped with a thermal analysis system: EXSTAR 6000. The amount of a weight decrease in III was used to express the weight of graphite. The percentage with respect to the weight of the sample from which the foaming agent had been removed was used to express the content of graphite. The graphite content calculated by this measurement method does not include, as a numerical value, that portion of the content of graphite in the styrene extruded foam which is of a component other than the fixed carbon content. In other words, the numerical value resulting from this measurement is smaller than that of the actual graphite content including components other than the fixed carbon content. The present specification defines a numerical value resulting from this measurement as "graphite content of the styrene resin extruded foam (unit: weight %)" in analysis results.

I. In a nitrogen stream of 200 mL/min, a temperature of the sample is raised from 40° C. to 600° C. at a rate of 20° C./min, and then the temperature 600° C. is maintained for 10 minutes.

II. In a nitrogen stream of 200 mL/min, the temperature of the sample is lowered from 600° C. to 400° C. at a rate of 10° C./min, and then the temperature 400° C. is maintained for 5 minutes.

III. In an air stream of 200 mL/min, the temperature of the sample is raised from 400° C. to 800° C. at a rate of 20° C./min, and then the temperature 800° C. is maintained for 15 minutes.

(2) Measurement of average particle diameter D50 (μm) of graphite and laser scattering intensity (%)

(2-1) Conditions of Preparation of Sample Solution (a) In a Case where a Styrene Resin Extruded Foam is to be Subjected to the Measurement 500 mg of a sample that has been heated at 170° C. for 10 minutes to remove a foaming agent is dissolved and dispersed in 20 mL of a toluene solution in which Span 80 [sorbitan monooleate available from Tokyo Chemical Industry Co., Ltd.] is dissolved (concentration of Span 80:0.1% (w/w)).

(b) In a Case where Graphite Before being Kneaded (i.e., Graphite Itself as a Raw Material) is to be Subjected to the Measurement 20 mg of the graphite and 480 mg of styrene resin [G9401, available from PS Japan Corporation] are dissolved and dispersed in 20 mL of a 0.1% (w/w) Span 80 toluene solution.

(c) In a Case where a Graphite Masterbatch is to be Subjected to the Measurement 40 mg of the graphite masterbatch is dissolved and dispersed in 20 mL of 0.1% (w/w) Span 80 toluene solution.

Subsequently, the sample solution above is subjected to ultrasonic irradiation with use of an ultrasonic cleaner so as to reduce aggregation of graphite.

(2-2) Conditions of Ultrasonic Irradiation

Device used: ultrasonic cleaner available from AS ONE Corporation; model number: USM Oscillation frequency: 42 kHz Duration of irradiation: 10 minutes Temperature: room temperature (2-3) Conditions of Measurement of Particle Size Measuring device: laser diffraction particle size distribution measuring device Mastersizer 3000, available from Malvern Light source: a 632.8 nm red He—Ne laser and a 470 nm blue LED Dispersant unit: wet dispersant unit Hydro MV In accordance with the following settings, measurement and analysis were performed by laser diffractometry based on Mie theory in accordance with ISO13320:2009, JIS Z8825-1 so as to obtain a volume distribution and calculate a D50 particle size of graphite in the sample from the volume distribution.

Particle type: nonspherical

Refractive index of graphite: 2.42

Absorptance of graphite: 1.0

Dispersion medium: 0.1% (w/w) Span 800 toluene solution

Refractive index of dispersion medium: 1.49

Rate of stirring in dispersant unit: 2500 rpm

Analysis model: generally used model; single mode is maintained

Temperature of measurement: room temperature (2-4) Procedure of Measurement 120 mL of 0.1% (w/w) Span 800 toluene solution was introduced into a dispersant unit, was stirred at 2500 rpm, and was stabilized as a result. In a state where a measurement cell contained no sample solution and contained only a dispersion medium, irradiation with a 632.8 nm red He—Ne laser beam was performed. At this time, an intensity of light was measured by a central detector as an intensity Lb of transmitted light. Subsequently, 2 mL of a sample solution, which had been subjected to an ultrasonic treatment, was collected and added to the dispersant unit. One minute after the addition of the sample solution, irradiation with a 632.8 nm red He—Ne laser beam was performed. At this time, an intensity of light was measured by the central detector as an intensity Ls of transmitted light. Simultaneously, a particle size (D50) was also measured. From Ls and Lb thus obtained, a laser scattering intensity Ob of the sample solution was calculated in accordance with the following formula.

$$Ob=(1-Ls/Lb) \times 100(\%)$$

The central detector is a detection section which is located in front of an output of the laser beams so as to face the output. Light detected by the central detector represents transmitted light that was not used for scattering. A laser scattering intensity represents an amount of a laser beam that is lost when a laser of an analysis device is scattered by a sample.

(2-5) Calculation of Laser Scattering Intensity Per Unit Solution Concentration of Styrene Resin Extruded Foam In accordance with the following formula, a laser scattering intensity per unit solution concentration of the styrene resin extruded foam was calculated.

Laser scattering intensity per unit solution concentration of the styrene resin extruded foam (%/(mg/mL))=laser scattering intensity (Ob)/{weight of sample(500 mg)/amount of toluene (20 mL)×amount of sample introduced(2 mL)/total amount of toluene in dispersant unit(120 mL+2 mL)}

The laser scattering intensity per unit solution concentration means a value obtained by dividing a measured laser scattering intensity by a concentration of a sample in toluene. Since this measuring device was a device that required measurement to be carried out with use of a solution, the concentration of a sample in the toluene solution was made constant so as to obtain measured values at a constant amount of the sample.

(6) Calculation of Laser Scattering Intensity Per Unit Solution Concentration of Graphite in a Styrene Resin Extruded Foam In accordance with the following formula, a laser scattering intensity per unit solution concentration of graphite contained in the styrene resin extruded foam was calculated.

Laser scattering intensity per unit solution concentration of graphite in a styrene resin extruded foam {%/(mg/mL)}/wt %=laser scattering intensity per unit solution concentration of the styrene resin extruded foam (%/(mg/mL))/graphite content of the styrene resin extruded foam (wt %)

It is an essence of one or more embodiments of the present invention that even with use of graphite having the same weight, an improvement in heat insulating property can be achieved by adjusting a state of the graphite contained in the styrene resin extruded foam, i.e., by adjusting a concentration at which the graphite is dispersed. The use of the above-described laser scattering intensity per unit solution concentration of graphite allows expressing one or more embodiments of the present invention.

(2-7) Calculation of Laser Scattering Intensity Per Unit Solution Concentration of Mixture of Graphite Before being Kneaded and Styrene Resin In accordance with the following formula, a laser scattering intensity per unit solution concentration of a mixture of graphite before being kneaded and a styrene resin was calculated.

Laser scattering intensity per unit solution concentration of mixture of graphite before being kneaded and styrene resin {%/(mg/mL)}=laser scattering intensity (Ob)/[{weight of graphite (20 mg)+styrene resin(480 mg)}/amount of toluene (20 mL)×amount of sample introduced (2 mL)/total amount of toluene in dispersant unit (120 mL+2 mL)]

(2-8) Laser Scattering Intensity Per Unit Solution Concentration of Graphite Before being Kneaded In accordance with the following formula, a laser scattering intensity per unit solution concentration of graphite before being kneaded (i.e., graphite as a raw material) was calculated.

Laser scattering intensity per unit solution concentration of graphite before being kneaded {%/(mg/mL)}/wt %=laser scattering intensity per unit solution concentration of mixture of graphite before being kneaded and styrene resin (%/(mg/mL))/graphite content in mixture of graphite before being kneaded and styrene resin (20/500×100=4 wt %)

(2-9) Calculation of Laser Scattering Intensity Per Unit Solution Concentration of Graphite Masterbatch In accordance with the following formula, a laser scattering intensity per unit solution concentration of the graphite masterbatch was calculated.

Laser scattering intensity per unit solution concentration of graphite masterbatch (%/(mg/mL))=laser scattering intensity (Ob)/{weight of masterbatch (40 mg)/amount of toluene (20 mL)×amount of sample introduced (2 mL)/total amount of toluene in dispersant unit (120 mL+2 mL)}

(2-10) Calculation of Laser Scattering Intensity Per Unit Solution Concentration of Graphite in Graphite Masterbatch In accordance with the following formula, a laser scattering intensity per unit solution concentration of graphite in the graphite masterbatch was calculated.

Laser scattering intensity per unit solution concentration of graphite in graphite master batch {%/(mg/mL)}/wt %=laser scattering intensity per unit solution concentration of graphite master batch (%/(mg/mL))/graphite content of graphite master batch (wt %)

(3) Content of HFO-1234Ze Per Kilogram of Extruded Foam

The obtained styrene resin extruded foam was left to stand still under the third-grade standard temperature condition (23° C.±5° C.) and the third-grade standard humidity condition ($50^{+20, -10}$% R.H.) each specified in JIS K 7100. Amounts of HFO-1234ze contained seven days after production were evaluated by the following method with use of the following apparatuses.

a) Apparatus; gas chromatograph GC-2014 [manufactured by Shimadzu Corporation]
b) Column; G-Column G-950 25UM [manufactured by Chemicals Evaluation and Research Institute, Japan]
c) Measurement conditions;
 Injection port temperature: 65° C.
 Column temperature: 80° C.
 Detector temperature: 100° C.

Carrier gas: high-purity helium
Carrier gas flow rate: 30 mL/minute
Detector: TCD
Electric current: 120 mA A test piece having a weight of approximately 1.2 g was cut off from the foam. Note that the weight varies depending on an apparent density of the test piece. The test piece was put in a closable glass vessel (hereinafter, referred to as a "closed vessel") having a capacity of approximately 130 cc. Air in the closed vessel was removed with use of a vacuum pump. Subsequently, the closed vessel was heated at 170° C. for 10 minutes so that a foaming agent in the foam was taken out into the closed vessel. After a temperature of the closed vessel returned to an ordinary temperature, helium was introduced into the closed vessel so that a pressure inside the closed vessel returned to an atmospheric pressure. Thereafter, 40 µL of a mixed gas containing the HFO-1234ze was taken out with use of a microsyringe, and was evaluated with use of the above apparatuses a) and b) under the above conditions c).

(4) Thickness of Styrene Resin Extruded Foam (Before Cutting)

Thicknesses of three portions of the styrene resin extruded foam were measured with use of a caliper [manufactured by Mitutoyo Corporation, M-type standard caliper N30]. The three portions included (i) a portion in the middle of the styrene resin extruded foam in a width direction of the styrene resin extruded foam, (ii) a portion which was located 150 mm apart from one edge of the styrene resin extruded foam toward the other edge of the styrene resin extruded foam in the width direction, and (iii) a portion which was located 150 mm apart from the other edge of the styrene resin extruded foam toward the one edge of the styrene resin extruded foam in the width direction. An average of the thicknesses of the three portions was regarded as a thickness of the styrene resin extruded foam.

(5) Apparent Density (Kg/m$^3$)

A weight, a length, a width, and the thickness of an obtained styrene resin extruded foam were measured.

From the weight, the length, the width, and the thickness thus measured, a density of the foam was calculated based on the following Expression. A unit was converted into kg/m$^3$.

Apparent density (g/cm$^3$)=a weight (g) of a foam/a volume (cm$^3$) of the foam (6) Closed Cell Ratio Test pieces each having a thickness of 40 mm, a length (extrusion direction) of 25 mm, and a width of 25 mm were cut off from three portions of the obtained styrene resin extruded foam. The three portions were (i) a portion in the middle of the styrene resin extruded foam in its width direction, (ii) a portion which was located 150 mm apart from one edge of the styrene resin extruded foam toward the other edge thereof in the width direction, and (iii) a portion which was located 150 mm apart from the other edge of the styrene resin extruded foam toward the one edge thereof in the width direction. When the test pieces were cut off, a surface of the styrene resin extruded foam was cut off so that a closed cell ratio could be measured of the vicinity of the middle portion in the thickness direction (that is, the portions indicated with black dots in FIG. 1(a)). Closed cell ratios of the test pieces were each measured in accordance with Procedure C of ASTM-D2856-70, and each calculated based on the following expression. An average of the closed cell ratios of the test pieces (that is, the three portions) was regarded as a closed cell ratio of the styrene resin extruded foam.

Closed cell ratio (%)=(V1−W/ρ)×100/(V2−W/ρ)

wherein: V1 (cm$^3$) represents a true volume of a test piece which true volume is measured with use of an air comparison pycnometer [manufactured by TOKYO SCIENCE., model 1000], V1 excluding a volume of cells other than closed cells; V2 (cm$^3$) represents an apparent volume of the test piece which apparent volume is calculated from external dimensions of the test piece that are measured with use of a caliper [manufactured by Mitutoyo Corporation, M-type standard caliper N30]; W (g) represents a total weight of the test piece; and ρ (g/cm$^3$) represents a density of a styrene resin constituting an extruded foam and is set to 1.05 (g/cm$^3$).

(7) Average Cell Diameter and Cell Deformation Ratio in Thickness Direction

An average cell diameter and a cell deformation ratio of the obtained styrene resin extruded foam were evaluated as described above.

(8) Thermal Conductivity

A test piece having a product thickness, a length (extrusion direction) of 300 mm, and a width of 300 mm was cut off from the styrene resin extruded foam. A thermal conductivity of the test piece was measured with use of a thermal conductivity measuring device [manufactured by EKO Instrument, HC-074] at an average temperature of 23° C. in accordance with JIS A 9521. Note that after the styrene resin extruded foam was produced, (i) the test piece having the above dimensions was cut off from the styrene resin extruded foam, (ii) the test piece was left to stand still under the third-grade standard temperature condition (23° C.±5° C.) and the third-grade standard humidity condition (50$^{+20, -10}$% R.H.) each specified in JIS K 7100, and then (iii) the above measurement was carried out 7 days after the production. The thermal conductivity value obtained by the measurement was evaluated in accordance with the criterion below.

(9) JIS Flammability

A test piece having a thickness of 10 mm, a length of 200 mm, and a width of 25 mm was cut off from the styrene resin extruded foam. A JIS flammability of the test piece was evaluated by the following criteria in accordance with JIS A 9521. Note that after the styrene resin extruded foam was produced, (i) the test piece having the above dimensions was cut off from the styrene resin extruded foam, (ii) the test piece was left to stand still under the third-grade standard temperature condition (23° C.±+5° C.) and the third-grade standard humidity condition (50$^{+20, -10}$% R.H.) each specified in JIS K 7100, and then (iii) the above measurement was carried out 7 days after the production.

Good: the test piece satisfied the following criterion: flame went out within three seconds, there was no afterglow, and the test piece did not burn beyond a burning limit indication line.

Poor: the test piece did not satisfy the above criterion.

[Preparation of Graphite Masterbatch A1]

Into a Banbury mixer, 100 parts by weight of a styrene resin [available from PS Japan Corporation, G9401], serving as a base resin, was introduced. Furthermore, 102 parts by weight of graphite A [available from MARUTOYO Co., Ltd., M-885] and 2.0 parts by weight of amide ethylene-bis-stearate [available from Nichiyu Corporation, ALFLOW H-50S], relative to 100 parts by weight of the styrene resin, were introduced into the Banbury mixer. Those materials were melted and kneaded for 20 minutes under a load of 5.0 kgf/cm$^2$ without being heated and cooled. At that time, a temperature of the resin was 190° C. The resin obtained was supplied to an extruder, and was extruded at a discharge quantity of 250 kg/hr through a die attached to an end of the extruder and having a small hole. The strand-shaped resin thus extruded was cooled and solidified in a water tank at 30° C. The resin obtained was then cut to obtain a styrene resin masterbatch having a graphite content of 50% by weight. In the master batch obtained, a laser scattering intensity per unit solution concentration of graphite was b=5.7 {%/(mg/mL)}/wt %. Note that a laser scattering intensity of graphite A before being kneaded was a=3.5 {%/(mg/mL)}/wt %. Accordingly, b=1.63a.

[Preparation of Graphite Masterbatches A2, A3, B1, C1, and D1]

Graphite masterbatches A2, A3, B1, C1, and D1 were each obtained in a manner similar to that in which the graphite masterbatch A1 was prepared, except that the type(s) of material(s), amount(s) thereof to be added, and/or the production condition(s) was changed as in Table 1. Table 1 shows the results of analysis of the masterbatches obtained.

[Preparation of Graphite Masterbatch A4]

Into a co-rotating twin-screw extruder having a screw diameter of 37 mm, (i) 100 parts by weight of a styrene resin [available from PS Japan Corporation, G9401] serving as a base resin, (ii) 44 parts by weight of graphite A [available from MARUTOYO Co., Ltd., M-885] relative to 100 parts by weight of the styrene resin, and (iii) 2.0 parts by weight of amide ethylene-bis-stearate [available from Nichiyu Corporation, ALFLOW H-50S] relative to 100 parts by weight of the styrene resin were each fed with use of a separate supply feeder so that the total amount would be 50 kg/hr. The mixture of the styrene resin, graphite A, and amide ethylene-bis-stearate fed into the twin-screw extruder was melted and kneaded at a screw rotation speed of 150 rpm while being heated at 200° C. A strand-shaped resin as extruded at a discharge quantity of 50 kg/hr through a die attached to an end of the twin-screw extruder and having a small hole was cooled and solidified in a water tank at 30° C. The resin obtained was then cut to obtain a styrene resin masterbatch having a graphite content of 30% by weight. The resin temperature measured at the die area was 220° C. In the master batch obtained, a laser scattering intensity per unit solution concentration of graphite was b=4.0 {%/(mg/mL)}/wt %. Note that a laser scattering intensity of graphite A before being kneaded was a=3.5 {%/(mg/mL)}/wt %. Accordingly, b=1.14a.

Example 1

[Preparation of Resin Mixture]

97.6 parts by weight of the styrene resin [available from PS Japan Corporation, G9401] serving as a base resin were dry-blended with, relative to 100 parts by weight of the styrene resin, (i) 5.0 parts by weight of the graphite masterbatch A1 as a heat ray radiation inhibitor, (ii) 3.0 parts by weight of a mixed bromine flame retarder [available from Dai-ichi Kogyo Seiyaku Co., Ltd., GR-125P] made up of tetrabromobisphenol A-bis(2,3-dibromo-2-methylpropyl) ether and tetrabromobisphenol A-bis(2,3-dibromopropyl) ether and serving as a flame retarder, (iii) 1.0 part by weight of a triphenylphosphine oxide [SUMITOMO SHOJI CHEMICALS CO., LTD.] serving as an auxiliary flame retarder, (iv) 0.20 parts by weight of bisphenol-A-glycidyl ether [available from ADEKA Corporation, EP-13], 0.20 parts by weight of triethylene glycol-bis-3-(3-t-butyl-4-hydroxy-5-methylphenyl)propionate [available from Songwon Japan K.K., SONGNOX 2450FF], 0.10 parts by weight of a dipentaerythritol-adipic acid reaction mixture [available from Ajinomoto Fine-Techno Co., Inc., PLENLIZER ST210] each serving as a stabilizer, (v) 0.20 parts by weight of calcium stearate [available from Sakai Chemical Industry Co., Ltd., SC-P] serving as a lubricant, (vi) 0.40 parts by weight of bentonite [available from HOJUN Co., Ltd., BEN-GEL BLITE 11K] and 0.40 parts by weight of silica [available from Evonik Degussa Japan Co., Ltd., Carplex BS-304F] each serving as a water absorbing medium, and (vii) 0.40 parts by weight of polyethylene glycol [available from Dai-Ichi Kogyo Seiyaku Co., Ltd., PEG6000] and 0.80 parts by weight of stearic acid monoglyceride [available from Riken Vitamin Co. Ltd., RIKEMAL S-100P] each as a moldability improving agent. Note that the graphite was prepared as a form of a masterbatch of a styrene resin in advance as described above, and was introduced during production of a resin mixture. In a case where the masterbatch was used, 100 parts by weight of a base resin was defined as a total amount of the base resin including the base resin contained in the masterbatch.

[Preparation of Extruded Foam]

A resin mixture thus obtained was supplied, at approximately 950 kg/hr, to an extruder which was made up of a single screw extruder (first extruder) having a screw diameter of 150 mm, a single screw extruder (second extruder)

TABLE 1

| | Kind of graphite masterbatch | | A1 | A2 | A3 | A4 | B1 | C1 | D1 |
|---|---|---|---|---|---|---|---|---|---|
| Mixture | Styrene resin | Parts by weight | 100 | 100 | 100 | 100 | 100 | 100 | 100 |
| | Graphite | Parts by weight | 102 | 102 | 102 | 44 | 102 | 102 | 102 |
| | Kind of graphite | — | A | A | A | A | B | C | D |
| | Amide ethylene-bis-stearate | Parts by weight | 2.0 | 2.0 | 2.0 | 2.0 | 2.0 | 2.0 | 2.0 |
| Production condition | Banbury mixer kneading load | kgf/cm2 | 5.0 | 4.5 | 5.5 | Produced with twin-screw extruder | 5.0 | 5.0 | 5.0 |
| | Banbury mixer kneading time | min | 20 | 15 | 20 | | 20 | 20 | 20 |
| | Resin temperature at the time of discharge from Banbury mixer | ° C. | 190 | 190 | 190 | | 190 | 190 | 190 |
| Analysis results | Graphite content | Weight % | 50 | 50 | 50 | 30 | 50 | 50 | 50 |
| | Graphite average particle diameter D50 | μm | 5.4 | 5.4 | 5.4 | 5.5 | 5.2 | 7.4 | 18.7 |
| | Laser scattering intensity per unit solution concentration of graphite (b) | {%/(mg/mL)}/wt % — | 5.7 1.63a | 5.3 1.51a | 6.1 1.74a | 4.0 1.14a | 6.2 1.55a | 5.0 1.67a | 4.7 1.81a | having a screw diameter of 200 mm, and a cooling device that were connected in series.

The resin mixture supplied to the first extruder was melted or plasticized and kneaded while being heated to a resin temperature of 240° C. Subsequently, a foaming agent (6.0 parts by weight of HFO-1234ze, 2.0 parts by weight of dimethyl ether, and 1.0 part by weight of water relative to 100 parts by weight of the base resin) was injected into the resin in the vicinity of an end of the first extruder. Thereafter, the resin mixture was cooled to a resin temperature of 119° C. in the second extruder, which was connected to the first extruder, and the cooling device, and then extruded to an atmosphere through a nozzle (slit die), which was provided to an end of the cooling device and which had a rectangular cross section having a thickness of 5 mm and a width of 400 mm, at a foaming pressure of 4.0 MPa so that the resin mixture was foamed. Then, with use of a mold attached to the nozzle and a forming roll provided on a downstream side of the mold, an extruded foam plate was obtained which had a cross section having a thickness of 60 mm and a width of 1000 mm. The extruded foam plate thus obtained was then cut with use of a cutter so as to have a thickness of 50 mm, a width of 910 mm, and a length of 1820 mm. Table 2 shows results of evaluating an obtained foam.

Examples 2 to 6

Extruded foams were obtained as in Example 1, except that a type(s) of a material(s), an amount(s) of a material(s) added, and/or a production condition(s) was/were changed as in Table 2. Table 2 shows physical properties of obtained extruded foams.

Comparative Examples 1 to 6

Extruded foams were obtained as in Example 1, except that a type(s) of a material(s), an amount(s) of a material(s) added, and/or a production condition(s) was/were changed as in Table 3. Table 3 shows physical properties of obtained extruded foams.

TABLE 2

| | | | | Example 1 | Example 2 | Example 3 | Example 4 | Example 5 | Example 6 |
|---|---|---|---|---|---|---|---|---|---|
| Mixture | Base resin*1 | Styrene resin | Parts by weight | 97.6 (100.0) | 95.1 (100.0) | 97.6 (100.0) | 97.6 (100.0) | 97.6 (100.0) | 97.6 (100.0) |
| | Heat ray radiation inhibitor | Kind of graphite | — | A | A | A | A | B | C |
| | | Graphite masterbatch*2 | Parts by weight | 5.0 (2.5) | 10.0 (5.0) | 5.0 (2.5) | 5.0 (2.5) | 5.0 (2.5) | 5.0 (2.5) |
| | | Kind of masterbatch | — | A1 | A1 | A2 | A3 | B1 | C1 |
| | | Graphite | Parts by weight | — | — | — | — | — | — |
| | Flame retarder | GR-125P | Parts by weight | 3.0 | 3.0 | 3.0 | 3.0 | 3.0 | 3.0 |
| | Auxiliary flame retarder | Triphenylphosphine oxide | Parts by weight | 1.0 | 1.0 | 1.0 | 1.0 | 1.0 | 1.0 |
| | Stabilizer | EP-13 | Parts by weight | 0.20 | 0.20 | 0.20 | 0.20 | 0.20 | 0.20 |
| | | PLENLIZER ST210 | Parts by weight | 0.10 | 0.10 | 0.10 | 0.10 | 0.10 | 0.10 |
| | | SONGNOX 2450FF | Parts by weight | 0.20 | 0.20 | 0.20 | 0.20 | 0.20 | 0.20 |
| | Lubricant | SC-P | Parts by weight | 0.20 | 0.20 | 0.20 | 0.20 | 0.20 | 0.20 |
| | Water absorbing medium | BEN-GEL BLITE 11K | Parts by weight | 0.40 | 0.40 | 0.40 | 0.40 | 0.40 | 0.40 |
| | | Carplex BS-304F | Parts by weight | 0.40 | 0.40 | 0.40 | 0.40 | 0.40 | 0.40 |
| | Moldability improving agent | PEG6000 | Parts by weight | 0.40 | 0.40 | 0.40 | 0.40 | 0.40 | 0.40 |
| | | S-100P | Parts by weight | 0.80 | 0.80 | 0.80 | 0.80 | 0.80 | 0.80 |
| | Foaming agent | HFO-1234ze | Parts by weight | 6.0 | 6.0 | 6.0 | 6.0 | 6.0 | 6.0 |
| | | Dimethyl ether | Parts by weight | 2.0 | 2.0 | 2.0 | 2.0 | 2.0 | 2.0 |
| | | Water | Parts by weight | 1.0 | 1.0 | 1.0 | 1.0 | 1.0 | 1.0 |
| | Amount of foaming agent added (per kilogram of extruded foam) | HFO-1234ze | mol | 0.44 | 0.44 | 0.44 | 0.44 | 0.44 | 0.44 |
| | | Dimethyl ether | mol | 0.37 | 0.36 | 0.37 | 0.37 | 0.37 | 0.37 |
| | | Water | mol | 0.47 | 0.46 | 0.47 | 0.47 | 0.47 | 0.47 |
| | | Total | mol | 1.28 | 1.26 | 1.28 | 1.28 | 1.28 | 1.28 |
| Production condition | Foaming temperature (resin temperature) | | ° C. | 119 | 119 | 119 | 119 | 119 | 119 |
| | Slit die thickness | | mm | 5 | 5 | 5 | 5 | 5 | 5 |
| | Foaming pressure | | MPa | 4.0 | 4.0 | 4.0 | 4.0 | 4.0 | 4.0 |

*1 The values in parentheses each show the total amount (unit: parts by weight), including styrene resin in the graphite masterbatch.
*2 The values in parentheses each show the amount (unit: parts by weight) of graphite contained in the graphite masterbatch relative to 100 parts by weight of the styrene resin.

TABLE 3

| | | | Example 1 | Example 2 | Example 3 | Example 4 | Example 5 | Example 6 |
|---|---|---|---|---|---|---|---|---|
| Analysis results | Graphite content | Weight % | 2.0 | 4.0 | 2.0 | 2.0 | 2.2 | 2.0 |
| | Graphite average particle diameter D50 (Y) | μm | 5.4 | 5.4 | 5.4 | 5.4 | 5.2 | 7.4 |
| | Laser scattering intensity per unit solution concentration of graphite (X) | {%/(mg/mL)}/wt % | 5.9 | 5.9 | 5.5 | 6.3 | 6.6 | 5.2 |
| | X + Y | — | 11.3 | 11.3 | 10.9 | 11.7 | 11.8 | 12.6 |

TABLE 3-continued

|  |  |  | Example 1 | Example 2 | Example 3 | Example 4 | Example 5 | Example 6 |
|---|---|---|---|---|---|---|---|---|
| Physical properties of extruded foam | Thickness of styrene resin extruded foam (before cut) | mm | 60 | 60 | 60 | 60 | 60 | 60 |
|  | Content of HFO-1234ze per kilogram of extruded foam | mol | 0.42 | 0.41 | 0.42 | 0.42 | 0.42 | 0.42 |
|  | Apparent density | kg/m$^3$ | 35 | 35 | 35 | 35 | 35 | 35 |
|  | Closed cell ratio | % | 95 | 95 | 95 | 95 | 95 | 95 |
|  | Average cell diameter in thickness direction | mm | 0.1 | 0.1 | 0.1 | 0.1 | 0.1 | 0.1 |
|  | Cell deformation ratio | — | 1.0 | 1.0 | 1.0 | 1.0 | 1.0 | 1.0 |
|  | Thermal conductivity | W/mK | 0.0222 | 0.0220 | 0.0223 | 0.0219 | 0.0220 | 0.0224 |
|  | JIS flammability | — | Good | Good | Good | Good | Good | Good |

TABLE 4

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Mixture | Base resin*1 | Styrene resin | Parts by weight | 85.3 (100.0) | 94.3 (100.0) | 97.6 (100.0) | 100 | 100 | 100 |
|  | Heat ray radiation inhibitor | Kind of graphite | — | A | A | D | A | B | C |
|  |  | Graphite masterbatch*2 | Parts by weight | 30.0 (15.0) | 8.3 (2.5) | 5.0 (2.5) | — | — | — |
|  |  | Kind of masterbatch | — | A1 | A4 | D1 | — | — | — |
|  |  | Graphite | Parts by weight | — | — | — | 25 | 25 | 25 |
|  | Flame retarder | GR-125P | Parts by weight | 3.0 | 3.0 | 3.0 | 3.0 | 3.0 | 3.0 |
|  | Auxiliary flame retarder | Triphenylphosphine oxide | Parts by weight | 1.0 | 1.0 | 1.0 | 1.0 | 1.0 | 1.0 |
|  | Stabilizer | EP-13 | Parts by weight | 0.20 | 0.20 | 0.20 | 0.20 | 0.20 | 0.20 |
|  |  | PLENLIZER ST210 | Parts by weight | 0.10 | 0.10 | 0.10 | 0.10 | 0.10 | 0.10 |
|  |  | SONGNOX 2450FF | Parts by weight | 0.20 | 0.20 | 0.20 | 0.20 | 0.20 | 0.20 |
|  | Lubricant | SC-P | Parts by weight | 0.20 | 0.20 | 0.20 | 0.20 | 0.20 | 0.20 |
|  | Water absorbing medium | BEN-GEL BLITE 11K | Parts by weight | 0.40 | 0.40 | 0.40 | 0.40 | 0.40 | 0.40 |
|  |  | Carplex BS-304F | Parts by weight | 0.40 | 0.40 | 0.40 | 0.40 | 0.40 | 0.40 |
|  | Moldability improving agent | PEG6000 | Parts by weight | 0.40 | 0.40 | 0.40 | 0.40 | 0.40 | 0.40 |
|  |  | S-100P | Parts by weight | 0.80 | 0.80 | 0.80 | 0.80 | 0.80 | 0.80 |
|  | Foaming agent | HFO-1234ze | Parts by weight | 6.0 | 6.0 | 6.0 | 6.0 | 6.0 | 6.0 |
|  |  | Dimethyl ether | Parts by weight | 2.0 | 2.0 | 2.0 | 2.0 | 2.0 | 2.0 |
|  |  | Water | Parts by weight | 1.0 | 1.0 | 1.0 | 1.0 | 1.0 | 1.0 |
|  | Amount of foaming agent added (per kilogram of extruded foam) | HFO-1234ze | mol | 0.40 | 0.44 | 0.44 | 0.45 | 0.45 | 0.45 |
|  |  | Dimethyl ether | mol | 0.33 | 0.37 | 0.37 | 0.37 | 0.37 | 0.37 |
|  |  | Water | mol | 0.42 | 0.47 | 0.47 | 0.47 | 0.47 | 0.47 |
|  |  | Total | mol | 1.16 | 1.28 | 1.28 | 1.28 | 1.28 | 1.28 |
| Production condition | Foaming temperature (resin temperature) |  | °C. | 124 | 119 | 119 | 119 | 119 | 119 |
|  | Slit die thickness |  | mm | 5 | 5 | 5 | 5 | 5 | 5 |
|  | Foaming pressure |  | MPa | 4.0 | 4.0 | 4.0 | 4.0 | 4.0 | 4.0 |

*1 The values in parentheses each show the total amount (unit: parts by weight), including styrene resin in the graphite masterbatch.
*2 The values in parentheses each show the amount (unit: parts by weight) of graphite contained in the graphite masterbatch relative to 100 parts by weight of the styrene resin.

TABLE 5

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Analysis results | Graphite content | Weight % | 10.9 | 2.0 | 2.2 | 2.0 | 2.2 | 2.0 |
|  | Graphite average particle diameter D50 (Y) | μm | 5.4 | 5.5 | 18.7 | 5.5 | 5.4 | 7.6 |
|  | Laser scattering intensity per unit solution concentration of graphite (X) | {%/(mg/mL)}/wt % | 5.9 | 4.2 | 4.7 | 3.7 | 4.5 | 3.2 |
|  | X + Y | — | 11.3 | 9.7 | 23.4 | 9.2 | 9.9 | 10.8 |

TABLE 5-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Physical properties of extruded foam | Thickness of styrene resin extruded foam (before cut) | mm | 60 | 60 | 60 | 60 | 60 | 60 |
|  | Content of HFO-1234ze per kilogram of extruded foam | mol | 0.38 | 0.42 | 0.42 | 0.42 | 0.42 | 0.42 |
|  | Apparent density | kg/m³ | 37 | 35 | 35 | 35 | 35 | 35 |
|  | Closed cell ratio | % | 80 | 95 | 95 | 95 | 95 | 95 |
|  | Average cell diameter in thickness direction | mm | 0.1 | 0.1 | 0.1 | 0.1 | 0.1 | 0.1 |
|  | Cell deformation ratio | — | 1.0 | 1.0 | 1.0 | 1.0 | 1.0 | 1.0 |
|  | Thermal conductivity | W/mK | 0.0240 | 0.0229 | 0.0230 | 0.0232 | 0.0230 | 0.0236 |
|  | JIS flammability | — | Good | Good | Good | Good | Good | Good |

Examples 1 to 6 show that in a case where the laser scattering intensity is not less than 5 {%/(mg/mL)}/wt % which laser scattering intensity is per unit solution concentration of graphite as measured by subjecting a solution, in which a styrene resin extruded foam is dispersed in a solvent, to measurement by laser diffractometry with use of a laser beam with a wavelength of 632.8 nm, the styrene resin extruded foam has a thermal conductivity of 0.0219 W/mK to 0.0224 W/mK. This is an improvement in the heat insulating property over a thermal conductivity of 0.0229 W/mK to 0.0236 W/mK of each of the respective styrene resin extruded foams of Comparative Examples 2 to 6, each of which had a laser scattering intensity as defined above of less than 5 {%/(mg/mL)}/wt %.

Examples 1 and 2 and Comparative Example 1 show that a graphite content within the range defined for one or more embodiments of the present invention allows the styrene resin extruded foam to have an excellent heat insulating property, that is, a thermal conductivity of 0.0220 W/mK to 0.0222 W/mK. A graphite content beyond the range defined for one or more embodiments of the present invention will cause the styrene resin extruded foam to have degraded physical properties and also have a poorer thermal conductivity of 0.0240 W/mK.

Examples 1, 5, and 6 and Comparative Example 3 show that in a case where the average particle diameter of graphite is within the range defined for one or more embodiments of the present invention, the laser scattering intensity is not less than 5 {%/(mg/mL)}/wt % which laser scattering intensity is per unit solution concentration of graphite as measured by subjecting a solution, in which a styrene resin extruded foam is dispersed in a solvent, to measurement by laser diffractometry with use of a laser beam with a wavelength of 632.8 nm, and the styrene resin extruded foam has an excellent heat insulating property, that is, a thermal conductivity of 0.0220 W/mK to 0.0224 W/mK. In a case where the average particle diameter of graphite is beyond the range defined for one or more embodiments of the present invention, the laser scattering intensity is less than 5 {%/(mg/mL)}/wt %, and the styrene resin extruded foam has a poorer thermal conductivity of 0.0230 W/mK.

Examples 1, 3, and 4 show that in a case where a graphite masterbatch is used that has been prepared through a stirring step within the scope of one or more embodiments of the present invention, the laser scattering intensity is not less than 5 {%/(mg/mL)}/wt % which laser scattering intensity is per unit solution concentration of graphite as measured by subjecting a solution, in which a styrene resin extruded foam is dispersed in a solvent, to measurement by laser diffractometry with use of a laser beam with a wavelength of 632.8 nm, and the styrene resin extruded foam has an excellent heat insulating property, that is, a thermal conductivity of 0.0219 W/mK to 0.0223 W/mK. In contrast, Comparative Examples 2, 4, 5, and 6 show that in a case where a graphite masterbatch is used that has been prepared by a method not including a stirring step within the scope of one or more embodiments of the present invention or a case where graphite is used not in the form of a styrene resin masterbatch, the laser scattering intensity is less than 5 {%/(mg/mL)}/wt %, and the styrene resin extruded foam has a poorer thermal conductivity of 0.0229 W/mK to 0.0236 W/mK.

Examples 1 to 6 generally show that a styrene resin extruded foam having an excellent heat insulating property can be obtained easily in a case where (i) the styrene resin extruded foam contains graphite in an amount and with an average particle diameter both within the scope of one or more embodiments of the present invention and (ii) the laser scattering intensity is within the scope of one or more embodiments of the present invention which laser scattering intensity is per unit solution concentration of graphite as measured by subjecting a solution, in which a styrene resin extruded foam is dispersed in a solvent, to measurement by laser diffractometry with use of a laser beam with a wavelength of 632.8 nm.

In a case where graphite with a given specific surface area is used, the laser scattering intensity in each of the Examples as defined above is within the scope of one or more embodiments of the present invention. The Examples and Comparative Examples show that the above arrangement allows easy production of a styrene resin extruded foam having an excellent heat insulating property.

A styrene resin extruded foam in accordance with one or more embodiments of the present invention has an excellent heat insulating property. The styrene resin extruded foam is therefore suitably usable as a heat insulating material for a house or a structure.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A styrene resin extruded foam, comprising graphite and a styrene resin,
   wherein the styrene resin extruded foam has a thickness of 10 to 150 mm,
   wherein the graphite is in an amount of 0.5 to 10.0 parts by weight relative to 100 parts by weight of the styrene resin,
   wherein the graphite has an average particle diameter of 2.5 to 9 μm, and
   wherein a laser scattering intensity is not less than 5 {%/(mg/mL)}/wt % per unit solution concentration of the graphite as measured by subjecting a solution, in which the styrene resin extruded foam is dispersed in a solvent, to measurement by laser diffractometry using a laser beam with a wavelength of 632.8 nm,
   wherein the average particle diameter of the graphite refers to a particle diameter at a time a cumulative volume relative to a volume of all particles reaches 50%, the cumulative volume being calculated by measuring and analyzing a particle size distribution by the laser diffractometry, and
   wherein the laser scattering intensity Ob % is determined as follows:
   an intensity Lb of transmitted light in a case where a toluene solution containing no styrene resin extruded foam is irradiated with a He—Ne laser beam having a wavelength of 632.8 nm and an intensity Ls of transmitted light in a case where a toluene solution containing styrene resin extruded foam having a predetermined weight is irradiated with the He—Ne laser beam having the wavelength of 632.8 nm are determined; and
   the laser scattering intensity Ob % is found in accordance with the following formula:

$Ob=(1-Ls/Lb)100(\%)$ on the basis of the laser scattering intensity Ob thus found, a laser scattering intensity per unit solution concentration of the styrene resin extruded foam is found; the laser scattering intensity per unit solution concentration thus found is divided by a content (wt %) of graphite in the styrene resin extruded foam having the predetermined weight, thus allowing the laser scattering intensity per unit solution concentration of graphite to be calculated.

2. The styrene resin extruded foam according to claim 1, wherein the laser scattering intensity per unit solution concentration of the graphite is not less than 5.5 {%/(mg/mL)}/wt %.

3. The styrene resin extruded foam according to claim 1, wherein X+Y>10, where X {%/(mg/ml)}/wt % is the laser scattering intensity per unit solution concentration of the graphite, and Y (μm) is the average particle diameter of the graphite.

4. The styrene resin extruded foam according to claim 1, wherein the average particle diameter of the graphite is 3 μm to 6 μm.

5. The styrene resin extruded foam according to claim 1, wherein the graphite has a fixed carbon content of not less than 80%.

6. The styrene resin extruded foam according to claim 1, wherein an amount of a hydrofluoroolefin added as a foaming agent to 100 parts by weight of the styrene resin is 1.0 to 14.0 parts by weight.

7. The styrene resin extruded foam according to claim 1, wherein the hydrofluoroolefin is contained in an amount of 0.05 to 1.0 mol relative to 1 kg of the styrene resin extruded foam.

8. The styrene resin extruded foam according to claim 6, wherein the hydrofluoroolefin is a tetrafluoropropene.

9. The styrene resin extruded foam according to claim 1, further comprising a bromine flame retarder in an amount of 0.5 to 5.0 parts by weight relative to 100 parts by weight of the styrene resin.

10. The styrene resin extruded foam according to claim 1, wherein the styrene resin extruded foam has a thermal conductivity of not more than 0.0224 W/mK, and wherein the thermal conductivity is measured within seven days of production of the styrene resin extruded foam in conformity to JIS A 9521.

11. The styrene resin extruded foam according to claim 1, wherein the styrene resin extruded foam has an apparent density of 20 to 45 kg/m³ and a closed cell ratio of not less than 85%.

12. A method for producing a styrene resin extruded foam, comprising:
    melting and kneading a styrene resin masterbatch, another styrene resin and a foaming agent in an extruder; and
    extrusion-foaming a melted-and-kneaded product,
    wherein the styrene resin masterbatch comprises graphite and a styrene resin, and the graphite is in an amount of 25 to 400 parts by weight relative to 100 parts by weight of the styrene resin;
    wherein the melted-and-kneaded product comprises 0.5 to 10 parts by weight graphite relative to 100 parts by weight total styrene resin;
    wherein the graphite has an average particle diameter of 2.5 to 9 μm, and
    wherein a laser scattering intensity is not less than 5 {%/(mg/mL)}/wt % per unit solution concentration of the graphite as measured by subjecting a solution, in which the styrene resin extruded foam is dispersed in a solvent, to measurement by laser diffractometry using a laser beam with a wavelength of 632.8 nm,
    wherein the average particle diameter of the graphite refers to a particle diameter at a time a cumulative volume relative to a volume of all particles reaches 50%, the cumulative volume being calculated by measuring and analyzing a particle size distribution by the laser diffractometry, and
    wherein the laser scattering intensity Ob % is determined as follows:
    an intensity Lb of transmitted light in a case where a toluene solution containing no styrene resin extruded foam is irradiated with a He—Ne laser beam having a wavelength of 632.8 nm and an intensity Ls of transmitted light in a case where a toluene solution containing styrene resin extruded foam having a predetermined weight is irradiated with the He—Ne laser beam having the wavelength of 632.8 nm are determined; and
    the laser scattering intensity Ob % is found in accordance with the following formula:

$Ob=(1-Ls/Lb)\times100(\%)$ on the basis of the laser scattering intensity Ob thus found, a laser scattering intensity per unit solution concentration of the styrene resin extruded foam is found; the laser scattering intensity per unit solution concentration thus found is divided by a content (wt %) of graphite in the styrene resin extruded foam having the predetermined weight, thus allowing the laser scattering intensity per unit solution concentration of graphite to be calculated, wherein the styrene resin extruded foam has a thickness of 10 to 150 mm.

13. The method according to claim 12, further comprising preparing the styrene resin masterbatch by kneading at least the styrene resin and the graphite in a kneading device including a twin-screw stirrer.

14. The method according to claim 13, wherein the kneading is carried out under a load of not less than 4 kgf/cm$^2$ for not shorter than 15 minutes and ends with a resin temperature of not lower than 170° C.

15. The method according to claim 13, wherein the kneading is carried out under a load of not less than 5 kgf/cm$^2$ for not shorter than 20 minutes.

16. The method according to claim 13, wherein the kneading is carried out such that b>1.4a, wherein a {%/(mg/mL)}/wt % is a laser scattering intensity per unit solution concentration of the graphite as measured by subjecting a solution, in which the graphite before being kneaded with the at least the styrene resin is dispersed in a solvent, to measurement by laser diffractometry using a laser beam with a wavelength of 632.8 nm, and wherein b {%/(mg/mL)}/wt % is a laser scattering intensity per unit solution concentration of the graphite as measured by subjecting a solution, in which the styrene resin masterbatch as kneaded is dispersed in a solvent, to measurement by laser diffractometry with use of a laser beam with the wavelength of 632.8 nm.

* * * * *